(12) United States Patent
Uehara

(10) Patent No.: US 7,192,354 B2
(45) Date of Patent: Mar. 20, 2007

(54) DAMPER MECHANISM AND DAMPER DISK ASSEMBLY

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 34 days.

(21) Appl. No.: 10/787,174

(22) Filed: Feb. 27, 2004

(65) Prior Publication Data

US 2004/0185941 A1 Sep. 23, 2004

(30) Foreign Application Priority Data

Mar. 19, 2003 (JP) .............................. 2003-075952

(51) Int. Cl.
*F15F 12/129* (2006.01)

(52) U.S. Cl. ........................................ 464/68.4; 188/83

(58) Field of Classification Search .............. 192/213.3, 192/213.31, 214, 214.1, 213.11, 213.12, 213.21, 192/213.22; 464/68.4, 68.41; 188/74, 83; 16/193, 342; 49/181
See application file for complete search history.

(56) References Cited

U.S. PATENT DOCUMENTS

| 4,368,812 | A | * | 1/1983 | Steeg | 192/214 |
| 4,787,612 | A | * | 11/1988 | Ball et al. | 464/68.41 X |
| 5,871,401 | A | * | 2/1999 | Maucher et al. | 464/68.4 |
| 6,302,799 | B1 | * | 10/2001 | Hashimoto et al. | 464/68.41 |

FOREIGN PATENT DOCUMENTS

DE 4026765 C2 2/1992

* cited by examiner

*Primary Examiner*—Greg Binda
(74) *Attorney, Agent, or Firm*—Global IP Counselors, LLP

(57) ABSTRACT

A first damper mechanism 159 for absorbing and attenuating minute torsional vibration in a damper disk assembly for transmitting torque in a vehicle, has a plate spring 162. The plate spring 162 extends in the rotational direction having main surfaces facing in the radial direction. The plate spring 162 is pushed by the hub 106 in the rotational direction to slide against the intermediate rotating member 110 when the hub 106 and the intermediate rotating member 108 rotate relative to each other, thereby generating friction resistance.

17 Claims, 15 Drawing Sheets

DAMPER MECHANISM AND DAMPER DISK ASSEMBLY

CROSS-REFERENCE TO RELATED APPLICATIONS

This application is related to previously application Ser. No. 10/437,007, filed May 14, 2003, now U.S. Pat. No. 6,837,354 patented Jan. 4, 2005, commonly assigned with the present invention.

BACKGROUND OF THE INVENTION

1. Field of the Invention

The present invention generally relates to a damper mechanism and a damper disk assembly. More specifically, the present invention relates to a damper mechanism and a damper disk assembly for absorbing and attenuating torsional vibrations while transmitting torque.

2. Background Information

A clutch disk assembly used in a vehicle has a clutch function and damper function. The clutch function is provided to facilitate connecting to and disconnecting from a flywheel. The damper function is provided to facilitate absorbing and attenuating torsional vibrations transmitted from the flywheel. Generally speaking, vibrations on a vehicle include idling noises (rattling), driving noises (acceleration/deceleration rattling, droning), and tip-in/tip-out or low frequency vibrations. Part of the damper function of the clutch disk assembly is provided to prevent these noises and vibrations.

The idling noises relate to a rattling sound generated in the transmission that typically occurs when a driver shifts into neutral while waiting for the traffic signal to turn green, and releases the clutch pedal. The reason for this noise is due to a large torque fluctuation that occurs when the engine combusts as the engine torque remains low at the engine idling speed. At such a moment, the input gear and the counter gear in the transmission are subject to a tooth beating phenomenon.

Tip-in/tip-out or low frequency vibrations are due to a large body sway that occurs when the acceleration pedal is abruptly engaged and then released. When the rigidity of the drive train is low, a torque, which is transmitted to the tires, is fed backward from a tire side to the torque, and a backlash phenomenon results causing an excessive torque on the tires, which then results in a large transient forward/backward vibration of the body.

Concerning the idling noise, critical torsional characteristics of the clutch disk assembly are in the zero torque neighborhoods. The torque therein should be as low as possible. On the other hand, it is necessary to make the torsional characteristics of the clutch disk assembly as rigid as possible in order to suppress the forward/backward vibration in the tip-in/tip-out phenomenon. In order to solve problems mentioned above, clutch disk assemblies with two stage characteristics having two kinds of spring members have been provided. In such a design, the torsional rigidity and the hysteresis torque in the first stage of the torsional characteristics (small torsional angle region) are kept low in order to achieve a noise suppression effect when idling. Since the torsional rigidity and the hysteresis torque are set high in the second stage of the torsional characteristics (large torsional angle region), the forward/backward vibration in tip-in/tip-out phenomenon can be sufficiently attenuated. Furthermore, a damper mechanism is also known which effectively absorbs minute torsional vibration in the second stage of the torsional characteristics by means of preventing the second stage large friction mechanism from operating when minute torsional vibrations resulting from fluctuations of engine combustion are supplied.

As mentioned above, a spring member with a lower rigidity and a friction generating mechanism having a small friction resistance in order to have a lower torsional rigidity and lower hysteresis torque during a first stage (small torsional angle region) in the torsional characteristics are known. The friction generating mechanism is, generally, composed of a friction washer and a spring member for urging the friction washer against the hub in the axial direction. In this structure, the number of parts is increased and the structure becomes complicated. Furthermore, the space needed to accommodate the friction generating mechanism is large. In addition, the structure for securing a rotational gap to prevent operation of the friction generating mechanism corresponding to minute torsional vibration is complicated.

In view of the above, it will be apparent to those skilled in the art from this disclosure that there exists a need for an improved damper mechanism or damper disk assembly that absorbs and attenuates torsional vibrations while transmitting torque. This invention addresses this need in the art as well as other needs, which will become apparent to those skilled in the art from this disclosure.

SUMMARY OF THE INVENTION

An object of the present invention is to provide a simple structure in a damper mechanism, which absorbs and attenuates minute torsional vibration during idling.

A damper mechanism in accordance with a fist preferred aspect of the present invention absorbs and attenuates minute torsional vibrations in a damper disk assembly that transmits torque in a vehicle. The damper mechanism includes a first rotating member, a second rotating member, and a plate member. The second rotating member is disposed relatively rotatable to the first rotating member within a limited angle. The plate member extends in the rotational direction and has main surfaces facing the radial direction. The plate member is pushed by the first rotating member in the rotational direction to slide against the second rotating member when the first and second rotating members rotate relative to each other, thereby generating friction resistance.

In this damper mechanism, when minute torsional vibrations are input to the damper disk assembly during idling, the first rotating member and the second rotating member rotate relative to each other. Thus, the plate member is pushed by the first rotating member and slides against the second rotating member, thereby generating frictional resistance. As a result, the minute torsional vibrations are quickly dampened. Use of the plate member simplifies the damper mechanism structure and decreases the number of parts.

A damper mechanism in accordance with a second aspect of the present invention is the damper mechanism of the first aspect, wherein the plate member is preferably held by the second rotating member such that the plate member can move in the rotational direction when the first rotating member pushes the plate member. Since the plate member is held by the second rotating member, the space for the plate member is small enough.

A damper mechanism in accordance with a third aspect of the present invention is the damper mechanism of the first or second aspects, wherein the plate member is preferably held by the second rotating member such that the member is elastically deformable. The plate member elastically urges itself against the second rotating member and slides against the second rotating member. With this structure, it is easy to set the amount of friction in the damper mechanism because the plate member itself determines load and friction coefficient of the friction generating mechanism in the damper mechanism.

A damper mechanism in accordance with a fourth aspect of the present invention is the damper mechanism of any of the first to third aspects, wherein the second rotating member is preferably formed with a holding portion having a groove. The groove extends in the rotational direction and has opposite openings in the rotational direction. The plate member is disposed in the groove having a rotational direction length longer than that of the groove. The first rotating member has a pair of contact portions disposed on each rotational direction side of the holding portion. The contact portions can respectively contact ends of the plate member. In this damper mechanism, when the first rotating member and the second rotating member rotate relative to each other, the contact portion of the first member pushes the end of the plate member so that the plate member slides along the groove of the second rotating member. When one of the contact portions abuts with the holding portion, relative rotation between the first rotating member and the second rotating member stops.

A damper mechanism in accordance with a fifth aspect of the present invention is the damper mechanism of the fourth aspect, wherein the rotation direction length between the pair of contact portions is preferably longer than the rotational direction length of the plate member, so that a rotational direction gap is secured at least between one of the ends of the plate member and one of the contact portions. In this damper mechanism, within the rotational direction gap the plate member does not slide against the second rotating member while the first rotating member and the second rotating member rotate relative to each other because the rotational gap is secured at least between one of the ends of the plate member and one of the contact portions. In other words, even in the torsional angular range by the first rotating member and the second rotating member, minute torsional vibrations corresponding to the rotational direction gap do not cause friction resistance. As a result, minute torsional vibration dampening performance is improved.

A damper mechanism in accordance with a sixth aspect of the present invention is the damper mechanism of any of the previously mentioned aspects that further has an elastic member. The elastic member is compressed in the rotational direction when the first and second rotating member rotate relative to each other. Therefore, the minute torsional vibration during idling is quickly absorbed.

A damper disk assembly in accordance with a seventh preferred aspect of the present invention transmits torque in a vehicle. The damper disk assembly has a hub, a disk-like rotating member, an elastic connection mechanism and damper mechanism. The disk-like rotating member is disposed relatively rotatable to the hub within a limited angle. The elastic connection mechanism elastically connects the hub with the disk-like rotating member in the rotational direction. The damper mechanism absorbs and attenuates minute torsional vibrations during idling of the vehicle. The damper mechanism operates only within an angular range whose range from a zero torsional angle is smaller than that within which the elastic connection mechanism operates. The damper mechanism includes an intermediate rotating member that is relatively rotatable to the hub within a limited angle, and a plate member extending in the rotational direction having main surfaces facing in the radial direction. The plate member is pushed by the hub in the rotational direction to slide against the intermediate rotating member, thereby generating frictional resistance, when the hub and intermediate rotating member rotate relative to each other.

In this damper disk assembly, when minute torsional vibrations are input to the damper disk assembly during idling, the hub and the intermediate rotating member rotate relative to each other. Thus, the plate member is pushed by the hub and slides against the intermediate rotating member, thereby generating frictional resistance. As a result, the minute torsional vibration is quickly dampened. The plate member makes the damper mechanism simpler, decreasing the number of parts.

A damper disk assembly in accordance with an eighth aspect of the present invention is the damper disk assembly of the seventh aspect, wherein the plate member is preferably held by the intermediate rotating member such that the plate member can move in the rotational of direction when the hub pushes the plate member. The space for the plate member is sufficiently small because the plate member is held by the intermediate rotating member.

A damper disk assembly in accordance with a ninth aspect of the present invention is the damper disk assembly of the seventh or eight aspects, wherein preferably, the plate member is held by the intermediate rotating member such that the plate member is elastically deformed. The plate member elastically urges itself against the intermediate rotating member and slides against the intermediate rotating member. With this structure, it is easy to set the amount of friction in the damper mechanism because the plate member itself determines the load and friction coefficient of the friction generating mechanism in the damper mechanism.

A damper disk assembly in accordance with a tenth aspect of the present invention is the damper disk assembly of any of the seventh to ninth aspects, wherein the intermediate rotating member is preferably formed with a holding portion having a groove. The groove extends in the rotational direction and has opposite openings in the rotational direction. The plate member is disposed in the groove having a rotational direction length longer than that of the groove. The hub has a pair of contact portions disposed on each rotational direction side of the holding portion. The contact portions can respectively contact ends of the plate member. In this damper disk assembly, when the hub and the intermediate rotating member rotate relative to each other, the contact portion of the hub pushes the end of the plate member so that the plate member slides along the groove of the intermediate rotating member. When one of the contact portions abuts with the holding portion, relative rotation between the hub and the intermediate rotating member stops.

A damper disk assembly of the eleventh aspect is the damper disk assembly of the tenth aspect, wherein the rotational direction length between the pair of contact portions is preferably longer than the rotational direction length of the plate member, so that a rotational direction gap is secured at least between one of the rotational ends of the plate member and one of the contact portions. In this damper disk assembly, the plate member does not slide against the intermediate rotating member within the rotational gap while the hub and the intermediate rotating member rotate relative to each other because the rotational gap is secured at least between on of the ends of the plate member and one of the contact portions. In other words, even in the torsional angular range of the hub and the intermediate rotating member, minute torsional vibrations corresponding to the rotational gap do not cause frictional resistance. As a result, minute torsional vibration dampening performance is improved.

A damper disk assembly of the twelfth aspect of the present invention is the damper disk assembly of any one of the seventh to eleventh aspects, that further includes an elastic member. The elastic member is compressed in the rotational direction when the hub and intermediate rotating member rotate relative to each other. Therefore, the minute torsional vibration during idling is quickly absorbed.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A preferred embodiment will now be explained.

(1) Overall Constitution

Figure 1:
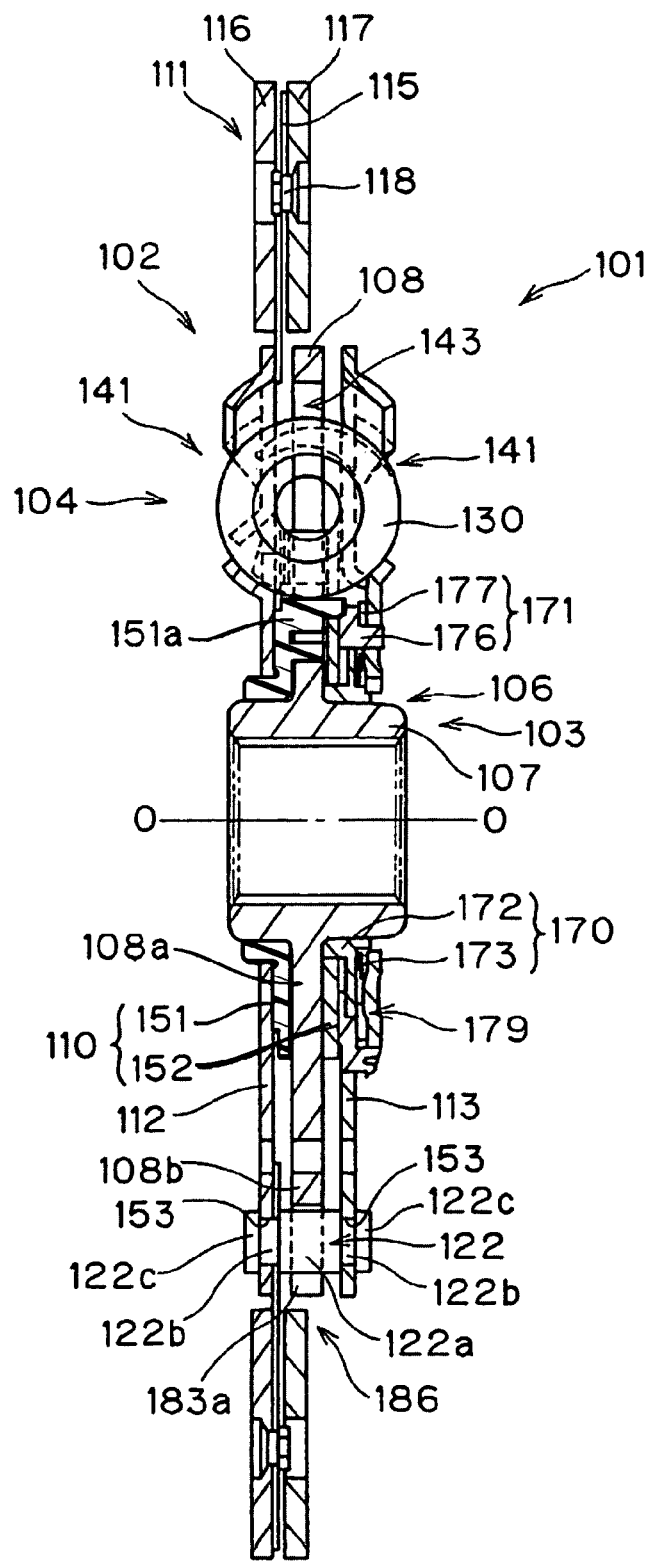
FIG. 1 is a vertical cross-sectional view of a clutch disk assembly in accordance with a preferred embodiment of the present invention, taken from angle I-O-I in FIG. 3.
Figure 2:
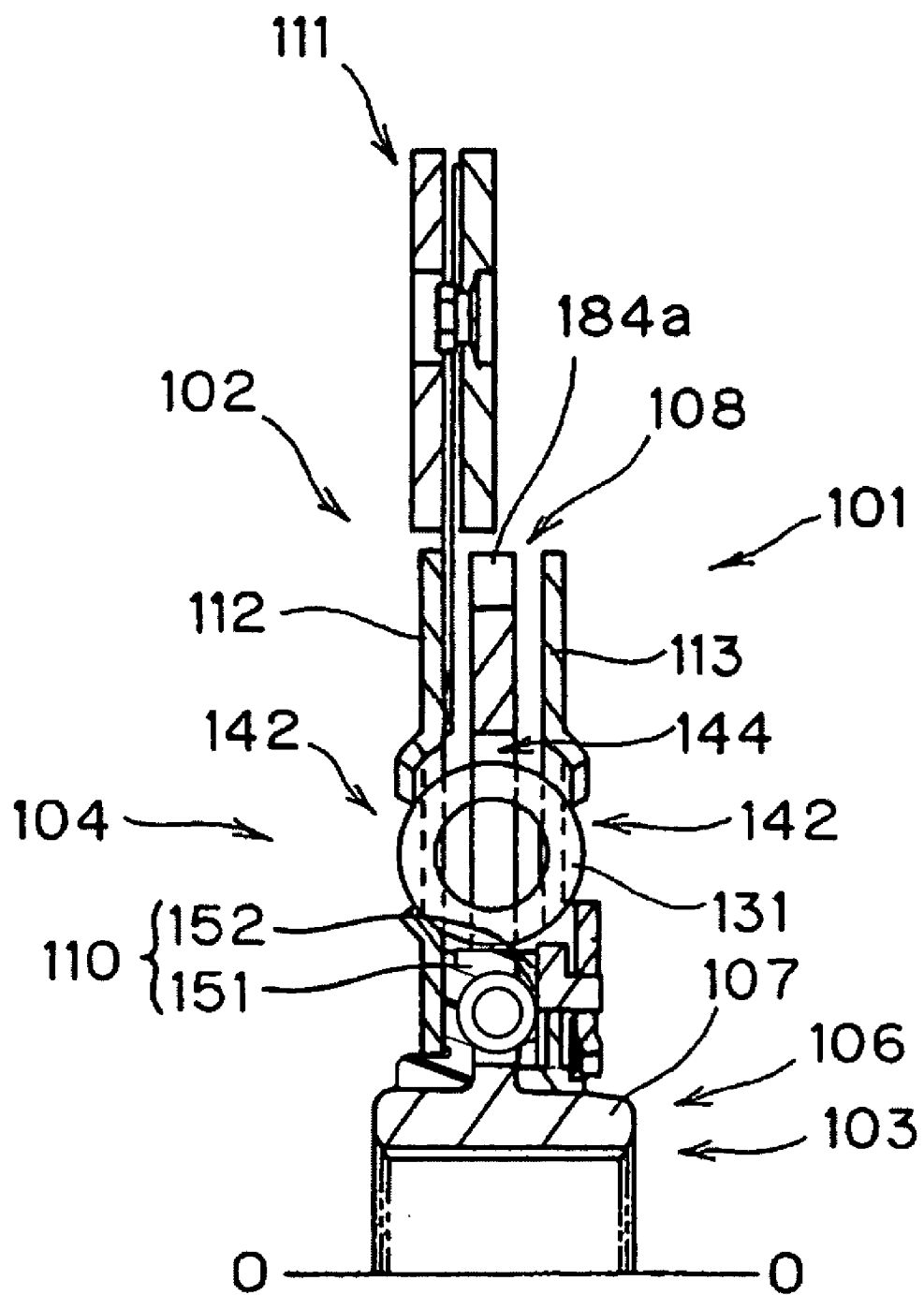
FIG. 2 is a vertical cross-sectional view of the clutch disk assembly in accordance with the preferred embodiment of the present invention, taken from line segment II-O in FIG. 3.
Figure 3:
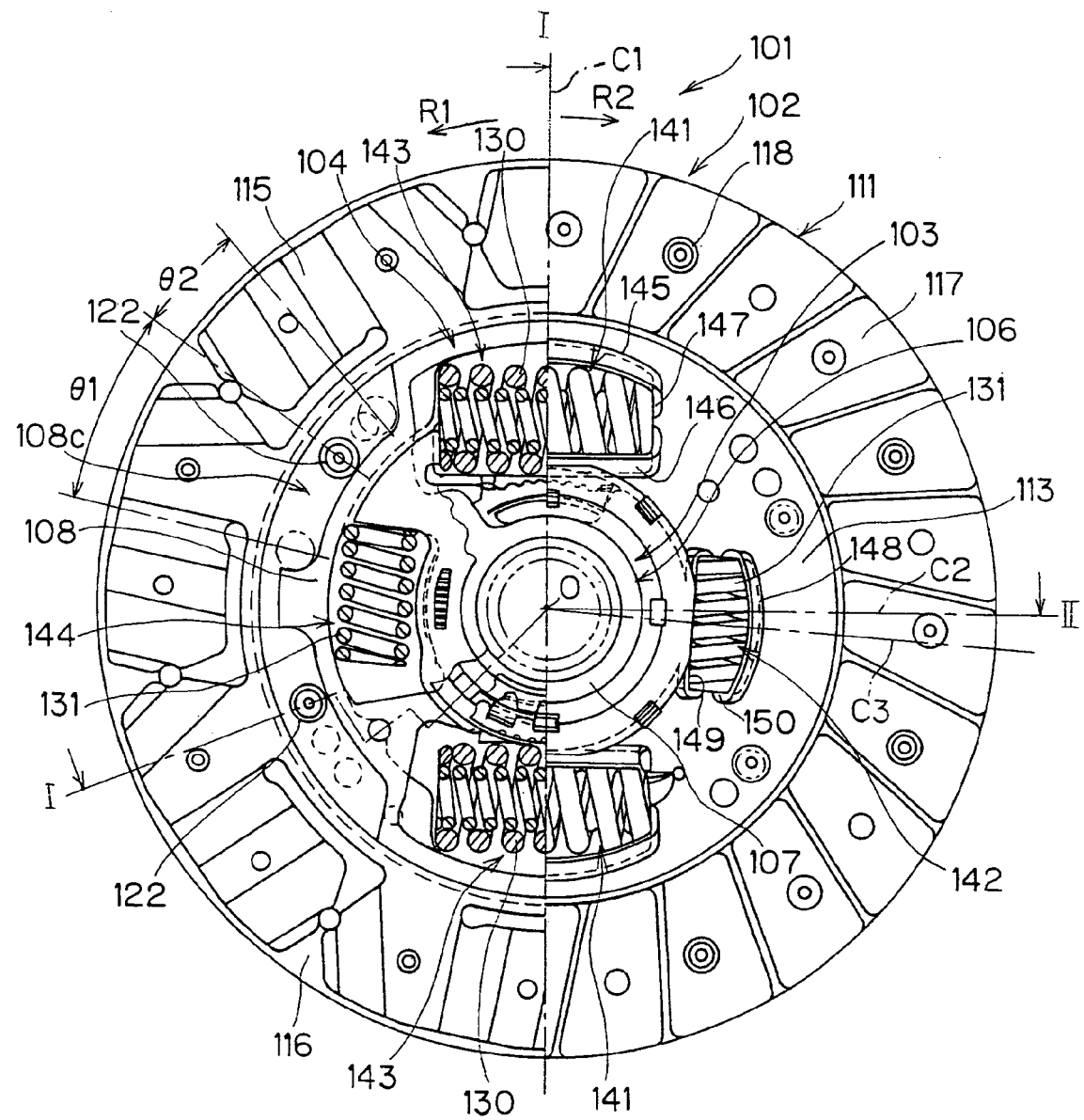
FIG. 3 is an elevational view of the clutch disk assembly of FIG. 1 with sections removed for illustrative purposes.

FIG. 1 and FIG. 2 are cross-sectional views of a clutch disk assembly 101 in accordance with a preferred embodiment of the present invention, and FIG. 3 is an elevational view of the same. The clutch disk assembly 101 is a power-transmitting device used in a clutch device of a vehicle (especially a FF, front engine and front drive, car), and has a clutch function and a damper function. The clutch function is provided to transmit and interrupt power by connecting and disconnecting with a flywheel (not shown). The damper function is provided to absorb and attenuate torque fluctuations supplied from the flywheel side by springs, etc. In FIG. 1 and FIG. 2, 0—0 represents the rotating axis of the clutch disk assembly 101. The engine and the flywheel (not shown) are located on the left side of FIG. 1, and the transmission (not shown) is located on the right side of FIG. 1. Arrow R1 in FIG. 3 represents the drive side (positive rotational direction) of the clutch disk assembly 101, while arrow R2 represents its opposite side (negative rotational side). Unless otherwise indicated, the "rotational (circumferential) direction," the "axial direction," and the "radial direction" mean each direction the clutch disk assembly 101 as a rotating member in the following explanation.

As seen in FIG. 1, the clutch disk assembly 101 primarily is made of an input rotational member 102, an output rotational member 103, and an elastic connection mechanism 104 located between the two rotational members 102 and 103. Also, these members constitute a damper mechanism that attenuates torsional vibrations while transmitting torque as well.

(2) Input Rotational Member

The input rotational member 102 is a member that receives torque from the flywheel (not shown). The input rotational member 102 primarily is made of a clutch disk 111, a clutch plate 112, and a retaining plate 113 (disk-like rotating members). The clutch disk 111 connects with the flywheel (not shown) when it is pressed against it. The clutch disk 111 includes cushioning plates 115 and a pair of friction facings 116 and 117 that are affixed on both sides thereof in the axial direction by rivets 118.

The clutch plate 112 and the retaining plate 113 are preferably both metallic circular and annular members and are arranged to maintain a certain distance between them in the axial direction. The clutch plate 112 is placed on the engine side of the assembly, and the retaining plate 113 is placed on the transmission side of the assembly. Stop pins 122 are provided on the outer periphery of the retaining plate 113 at multiple, preferably four, places, which are specifically spaced in the circumferential direction. The stop pins 122 are cylindrical members extending in the axial direction. Each stop pin 122 is made of a barrel part 122a, neck parts 122b, and heads 122c. The barrel part 122a is interposed between the plates 112 and 113 in the axial direction. The neck parts 122b extend from both ends of the barrel part 122a and are arranged in holes 153 of the plates 112 and 113.

Further, the heads 122c abut with the outer axial sides of the plates 112 and 113 in the axial direction. One side of the heads 122c is formed by caulking. The stop pins 122 ensure that the clutch plate 112 and the retaining plate 113 rotate together and determine the axial distance between the plates 112 and 113. The stop pins 122 affix the inner periphery of the cushioning plate 115 to the outer periphery of the clutch plate 112. The pin members of this invention are not limited in the structure or the shape of stop pins 122 shown here.

Figure 4:
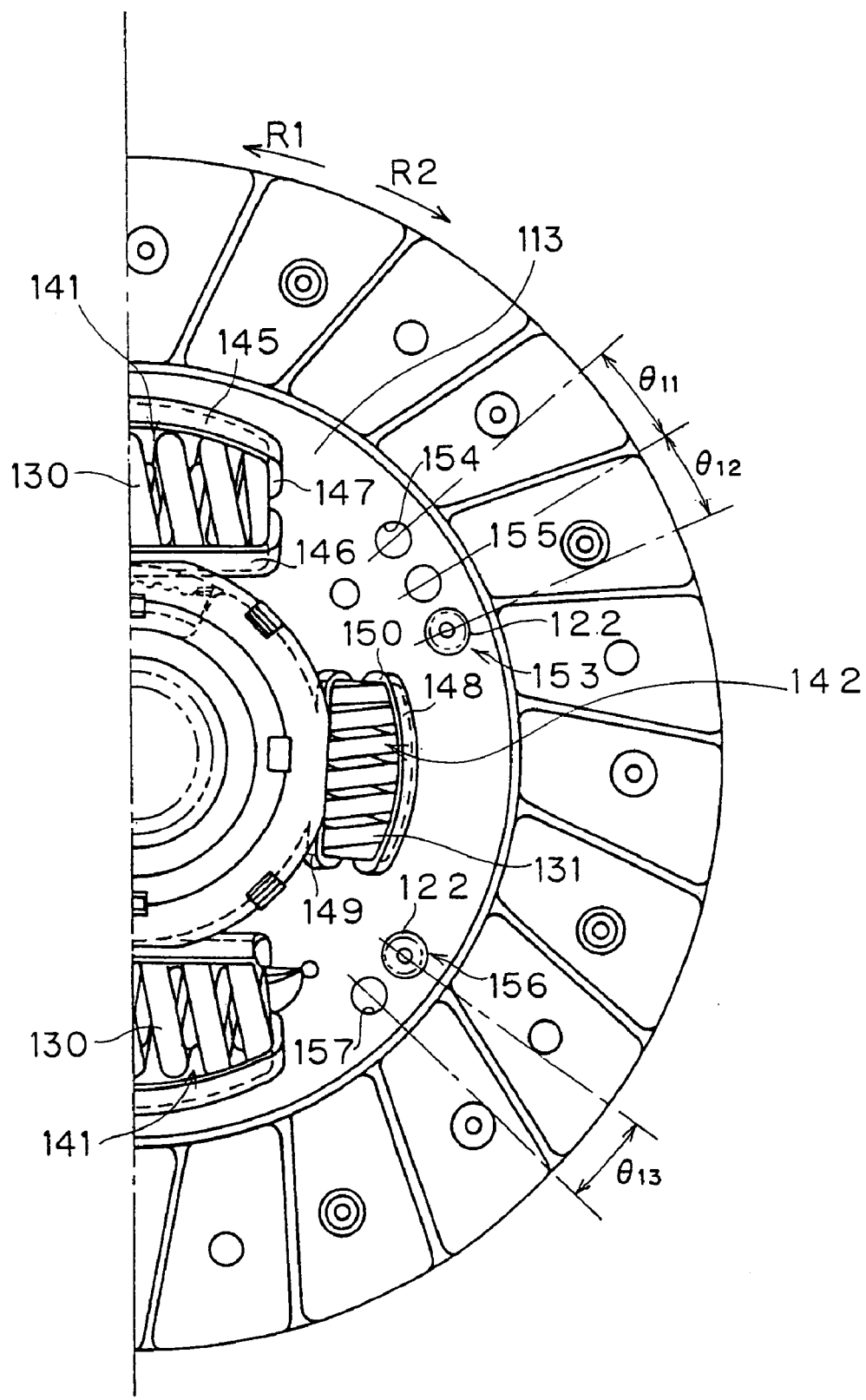
FIG. 4 is an enlarged fragmentary view of FIG. 3 illustrating a partial elevational view of the clutch disk assembly.

Each of the clutch plate 112 and the retaining plate 113 have a center hole. A boss 107, to be described later, is placed inside the center holes. As seen in FIG. 3, the clutch plate 112 and the retaining plate 113 are each provided with multiple windows 141 and 142 formed in the circumferential direction. The windows 141 and 142 have an identical or substantially identical shape and are formed at multiple, preferably four, places, which are equally spaced in the circumferential direction. Each of the windows 141 and 142 has a shape extending substantially in the circumferential direction. The pair of windows 141 located apart from each other in the vertical direction in FIG. 3 and FIG. 4 is called first windows 141, and the pair of windows 142 located apart from each other in the horizontal direction in FIG. 3 and FIG. 4 is called second windows 142. The windows 141 and 142 have holes penetrating in the axial direction and a support part formed along the hole periphery.

The supporting parts of the first windows 141 are made of an outer periphery supporting part 145, an inner periphery supporting part 146, and a rotational direction supporting part 147. In an elevational view, the outer periphery supporting part 145 is curved substantially in the circumferential direction, while the inner periphery supporting part 146 extends substantially straight. The rotational direction supporting part 147 extends substantially straight in the radial direction, and is parallel or substantially parallel to a straight line passing through the center of the windows 141 and the center O of the clutch disk assembly 101. The outer periphery support part 145 and the inner periphery support part 146 are both formed by raising other parts of the plate 112 or 113 in the axial direction.

The supporting parts of the second windows 142 are made of an outer periphery supporting part 148, an inner periphery supporting part 149, and a rotational direction supporting part 150. In an elevational view, the outer periphery supporting part 148 is curved substantially in the circumferential direction, while the inner periphery supporting part 149 extends substantially straight. If a straight line connecting the centers of the first windows 141 in the rotational direction is called C1 and a straight line perpendicular to it is called C2 as shown in FIG. 3, a straight line C3 connecting the centers of the second windows 142 in the rotational direction is offset by a certain angle relative to straight line C2 by a certain angle on the rotational direction R2 side. In other words, each second window 142 is closer to the first window 141 on the rotational direction R2 side than toward the first window 141 on the rotational direction R1 side. The second windows 142 are shorter than the first windows 141 both in terms of the rotational direction length and the radial direction width. Moreover, the inner radius of the second windows 142 is substantially equal to the inner radius of the first windows 141, but the outer diameter of the second windows 142 is smaller than the outer diameter of the first windows 141.

The positions of the stop pins 122 on the plates 112 and 113 will be described below. The stop pins 122 are provided on the outer peripheries of the plates 112 and 113 between the windows 141 and 142 in the rotational direction. More specifically, in a neutral state the stop pins 122 are located closer to the second windows 142 rather than to a midpoint between the windows 141 and 142. The radial positions of the stop pins 122 are outward those of the outer edges of the second windows 142, although the radial positions of the stop pins 22 are radially inward of the outer edges of the first windows 141. More specifically, even the radial positions of the innermost points of the stop pins 122 are still outward of those of the outer edges of the second windows 142.

As shown in FIG. 4, pin mounting holes 154 and 155 are provided on both sides in the rotational direction R1 of the stop pins 122 provided on the rotational direction R2 side of the first windows 141 on the clutch plate 112 and the retaining plate 113. In other words, there are preferably three holes 153 through 155 formed in a row in the rotational direction including a hole 153 in which the stop pin 122 is actually installed. The rotational direction angle between the pin installation holes 155 and 154 is θ11, and the rotational direction angle between the pin installation holes 155 and 153 is θ12. The pin mounting holes 157 are provided on the rotational direction R2 side of the stop pins 122 provided on the rotational direction R1 side of the first windows 141 on the clutch plate 112 and the retaining plate 113. In other words, there are two holes 156 and 157 formed in a row in the rotational direction including a hole 156 in which the stop pin 122 is actually installed. The rotational direction angle between pin installation holes 156 and 157 is θ13. In this embodiment, the sizes of θ11 through θ13 are preferably the same and more preferably are equal or substantially equal to 9 degrees.

(3) Output Rotational Member

As seen in FIG. 1, the output rotational member 103 is provided to receive torque from the input rotational member 102 via the elastic connection mechanism 104 and to supply torque to a transmission input shaft. The output rotational member 103 primarily is made of a hub 106 (first rotating member). The hub 106 is made of a boss 107 and a flange 108.

The boss 107 is a tube like member placed in the center hole of the clutch plate 112 and the retaining plate 113. The boss 107 forms a spline engagement with a transmission input shaft (not shown) inserted into the center hole. The flange 108 is a circular disk shape part formed integrally with the boss 107 on its outer periphery and extends outward. The flange 108 is located between the clutch plate 112 and the retaining plate 113 in the axial direction. The flange 108 is made of an annular-shaped inner periphery part 108a located at its innermost side, and an outer periphery part 108b provided on its outer periphery side.

Figure 5:
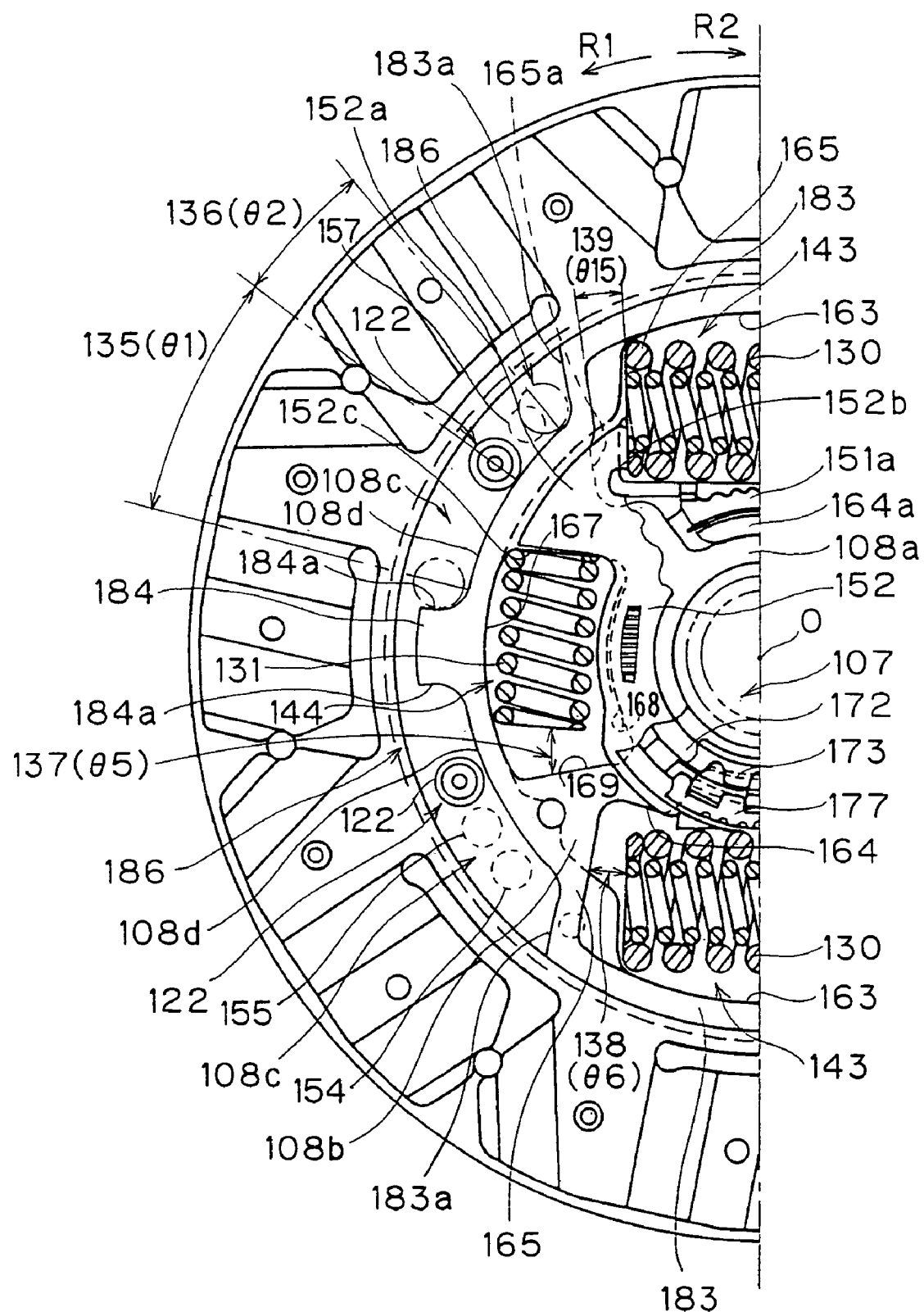
FIG. 5 is an alternate enlarged fragmentary view of FIG. 3 illustrating a partial elevational view of the clutch disk assembly.

As seen in FIG. 3, window Openings 143 and 144 are formed in the outer periphery 108b of the flange 108 to correspond respectively with the windows 141 and 142. In other words, multiple, preferably four, window openings 143 and 144 are formed along the circumferential direction in the same radial position as the windows 141 and 142. The pair of window openings 143 located apart from each other in the vertical direction in FIG. 3 and FIG. 5 is called first window openings 143, and the pair of window openings located apart from each other in the horizontal direction in FIG. 3 and FIG. 5 is called second window openings 144. Each window opening 143 is an opening punched through axially and extends in the circumferential direction. As seen in FIG. 5, each window opening 143 has an outer periphery supporting part 163, an inner periphery supporting part 164, and rotational direction supporting part parts 165. The outer periphery supporting part 163 connects to the rotational direction supporting parts, which connect to the inner periphery supporting part 164. In an elevational view, the outer periphery supporting part 163 and the inner periphery supporting part 164 are curved in the circumferential direction. The rotational direction supporting part 165 extends substantially straight along the radial direction and, more specifically, the rotational direction supporting part 165 is parallel to a straight line connecting the center of the window opening 143 in the rotational direction and the center O of the clutch disk assembly 101. The rotational direction supporting part 165 on the rotational direction R1 side has a rotational direction concave part 165a formed on the inner periphery side. The rotational direction concave part 165a is slightly indented toward the rotational direction R1 side relative to the part on the outer periphery side. A radial direction concave part 164a is formed in the middle of the inner periphery supporting part 164. The radial direction concave part 164a is indented toward the inside of the radial direction relative to both sides in the rotational direction.

The first windows 141 are shorter than the first window openings 143 in the rotational direction. Consequently, the rotational direction supporting part 147 of the first window 141 on the rotational direction R1 side secures a rotational direction gap 139 (θ15) between it and the rotational direction supporting part 165 of the first window opening 143 on the rotational direction R1 side. Also, the rotational direction supporting part 147 of the first window 141 on the rotational direction R2 side secures a rotational direction gap 138 (θ6) between it and the rotational direction supporting part 165 of the first window opening 143 on the rotational direction R2 side.

Figure 9:
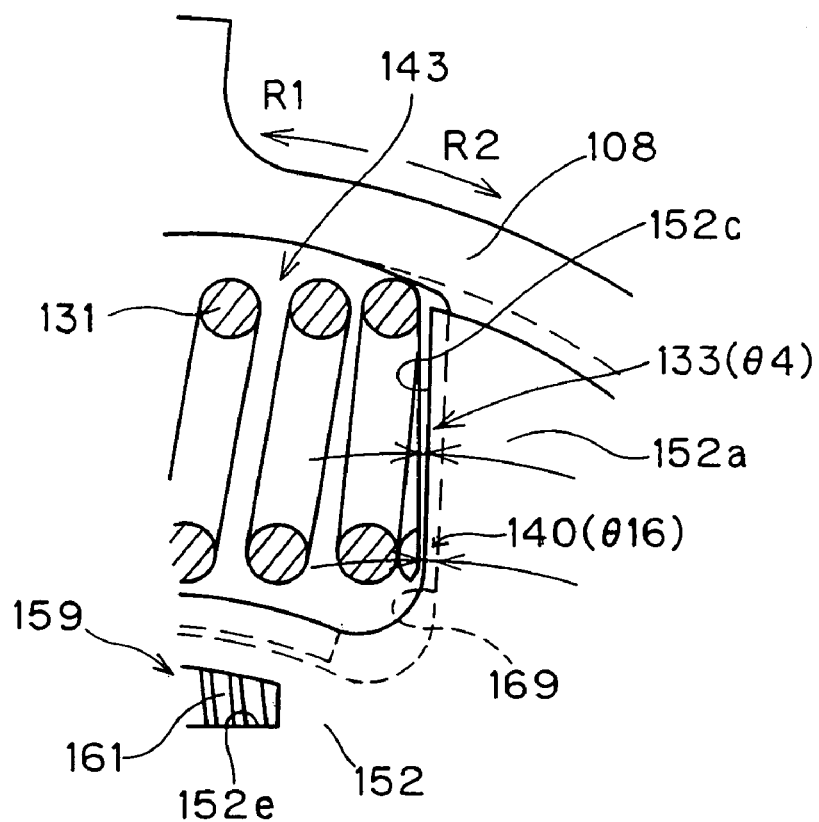
FIG. 9 is a partial elevational view a second elastic member, a flange, and a plate of the clutch disk assembly of FIG. 1 illustrating the torsional angle relationship therebetween.

The second window opening 144 is an opening punched through axially and extends in the circumferential direction. Each window opening 144 has an outer periphery supporting part 167, an inner periphery supporting part 168, and a rotational direction supporting part 169. In an elevational view, the outer periphery supporting part 167 and the inner periphery supporting part 168 are curved along the circumferential direction. The rotational direction supporting part 169 extends substantially straight along the radial direction and, more specifically, the rotational direction supporting part 169 is parallel to a straight line connecting the center of the second window opening 144 in the rotational direction and the center O of the clutch disk assembly 1. The second windows 142 are shorter than the second window openings 144 in the rotational direction. Consequently, as seen in FIG. 9, the rotational direction supporting part 150 of the second window 142 on the rotational direction R2 side secures a rotational direction gap 140 (θ16) between it and the rotational direction supporting part 169 of the second window opening 144 on the rotational direction R2 side. Referring again to FIG. 5, the rotational direction supporting part 150 of the second window 142 on the rotational direction R1 side secures a rotational direction gap 137 (θ5) of a specified angle between it and the rotational direction supporting part 169 of the second window opening 144 on the rotational direction R1 side.

Notches 108c are formed on the outer periphery of the flange 108 for the stop pins 122 to pass through in an axial direction. Each notch 108c is located between each pair of window openings 143 and 144 in the rotational direction. Further, each stop pin 122 is movable in the notch 108c in the rotational direction. The notches 108c are formed in between the radial direction protrusions 183 where the first window openings 143 are formed and the radial direction protrusions 184 on the radial outside of the second window opening 144. In other words, each notch 108c is formed by an outer edge 108d of the flange 108 and the rotational direction surfaces 183a and 184a of the protrusions 183 and 184 respectively. When viewed from the stop pin 122, a first rotational gap 135 (θ1) is defined between the stop pin 122 and the rotational direction surfaces 184a on the rotational direction R1 side, while a second rotational gap 136 (θ2) is defined between the stop pin 122 and the rotational direction surfaces 183a on the rotational direction R2 side. Thus, the stop pin 122, protrusions 183 and 184, and the notch 108c constitute a torsional angle stopper mechanism 186 of the clutch disk assembly 101.

The pin installation holes 153 through 157 on the clutch plate 112 and the retaining plate 113 are provided within the circumferential direction width of the notch 108c. In other words, the notch 108c has a circumferential width that extends beyond the outermost parts of the multiple pin installation holes 153 through 157. As a result, the torsional stopper 186 can be materialized regardless of which pin installation holes are used to install the stop pins 122.

Each protrusion 184 is formed in correspondence with the second window openings 144 and their centers in the rotational direction coincide with each other. However, since the protrusion 184 can have a shorter rotational direction length when compared to the second window 144, the rotational direction surfaces 184a in that case are located inside of the rotational direction supporting parts 169 in the rotational direction. Thus, the notches 108c extend past a portion of the outer periphery side of the second windows 144, so that the stop pins 122 can move to a place radially outward of the second window openings 144. In other words, the stopper mechanisms 186, more specifically the stop pins 122, do not interfere with the second window openings 144 in the rotational direction. As a result, the torsional angle of the torsional angle stopper 186 is larger than that of the conventionally designed clutch disk assemblies.

(4) Elastic Connection Mechanism

As seen in FIGS. 1 and 3, the elastic connection mechanism 104 is provided to transmit torque from the input rotational member 102 to the output rotational member 103 and to absorb and attenuate torsional vibrations. The elastic connection mechanism 104 preferably is made of a plurality of elastic members 130 and 131. This embodiment uses four elastic members 130 and 131. Each of the elastic members 130 and 131 are provided in the first window openings 143 and 144 as well as windows 141 and 142. The elastic members 130 and 131 are made of two kinds of elastic members, i.e., the first elastic members 130 placed in the first window openings 143 and the first windows 141, and the second elastic members 131 placed in the second window openings 144 and the second windows 142. The first elastic members 130 are coil springs that extend in the rotational direction; both ends of the coil springs in the rotational direction are supported by both the rotational direction supporting parts 147 of the first windows 141. Therefore, as seen in FIG. 5, the rotational direction R1 side edge of the first elastic member 130 secures a rotational direction gap 139 (θ15) between the first elastic member 130 and the rotational direction supporting part 165 of the first window opening 143, while the rotational direction R2 side edge of the first elastic member 130 secures a fourth rotational direction gap 138 (θ6) between it and the rotational direction supporting part 165 of the first window opening 143.

The second elastic members 131 are coil springs that extend in the rotational direction and are smaller in the rotational length and the coil diameter, having a smaller spring constant (lower rigidity) compared to the first elastic members 130. Both rotational direction ends of each second elastic member 131 are supported by both rotational direction supporting parts 150 of the second window 142. Therefore, as shown in FIG. 9, the rotational direction R2 side edge of the second elastic member 131 secures a rotational direction gap 140 (θ16) between it and the rotational direction supporting part 150 of the second window opening 144, while, as seen in FIG. 5, the rotational direction R1 side edge of the second elastic member 131 secures a third rotational direction gap 137 (θ5) between it and the rotational direction supporting part 169 of the second window opening 144.

(5) Intermediate Rotating Member

As seen in FIG. 1, an intermediate rotating member 110 (second rotating member) is a member provided in such a way as to be able to allow relative rotation between the input rotational member 102 and the output rotational member 103. The intermediate rotating member 110 engages the output rotational member 103 in the rotational direction and forms a second friction generating unit 171 (to be described later) between it and the input rotating member 102. The intermediate rotating member 110 is preferably made of a bush 151 and a plate 152.

Figure 10:
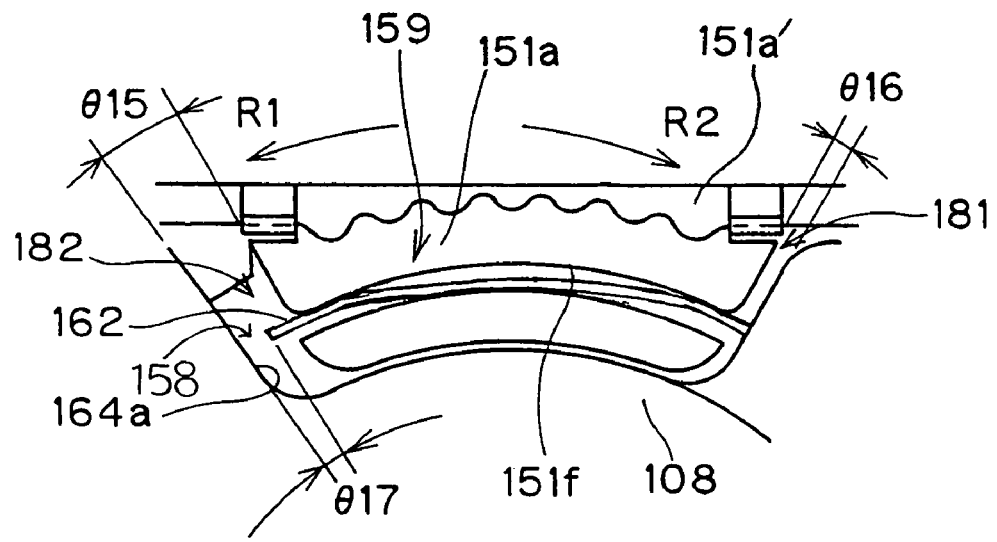
FIG. 10 is a partial elevational view illustrating a first damper mechanism of the clutch disk assembly of FIG. 1.

The bush 151 is an, annular member placed between the inner periphery of the clutch plate 112 and the flange 108 and is typically made of a plastic material. The bush 151 extends axially toward the transmission, and has a protrusion 151a that extends through the radial direction concave part 164a of the first window opening 143. As shown in FIG. 10, the rotational direction length (angle) of the protruding part 151a is smaller than the rotational direction length (angle) of the radial direction concave part 164a, so that the protruding part 151a is movable within the radial direction concave part 164a in the rotational direction. In a neutral condition shown in FIG. 10, a rotational direction gap 182 (θ15) is secured between the rotational direction R1 side edge of the protruding part 151a and the rotational direction R1 side wall of radial direction the concave part 164a, while a rotational direction gap 181 (θ16) is secured between the rotational direction R2 side edge of the protruding part 151a and the rotational direction R2 side wall of the radial direction concave part 164a. Consequently, the flange 108 and the intermediate rotating member 110 are rotatable to each other within a specified angle, and the protruding part 151a and the concave part 164a constitute the torsional angle stopper of a first damper mechanism 159 (to be described later).

Figure 7:
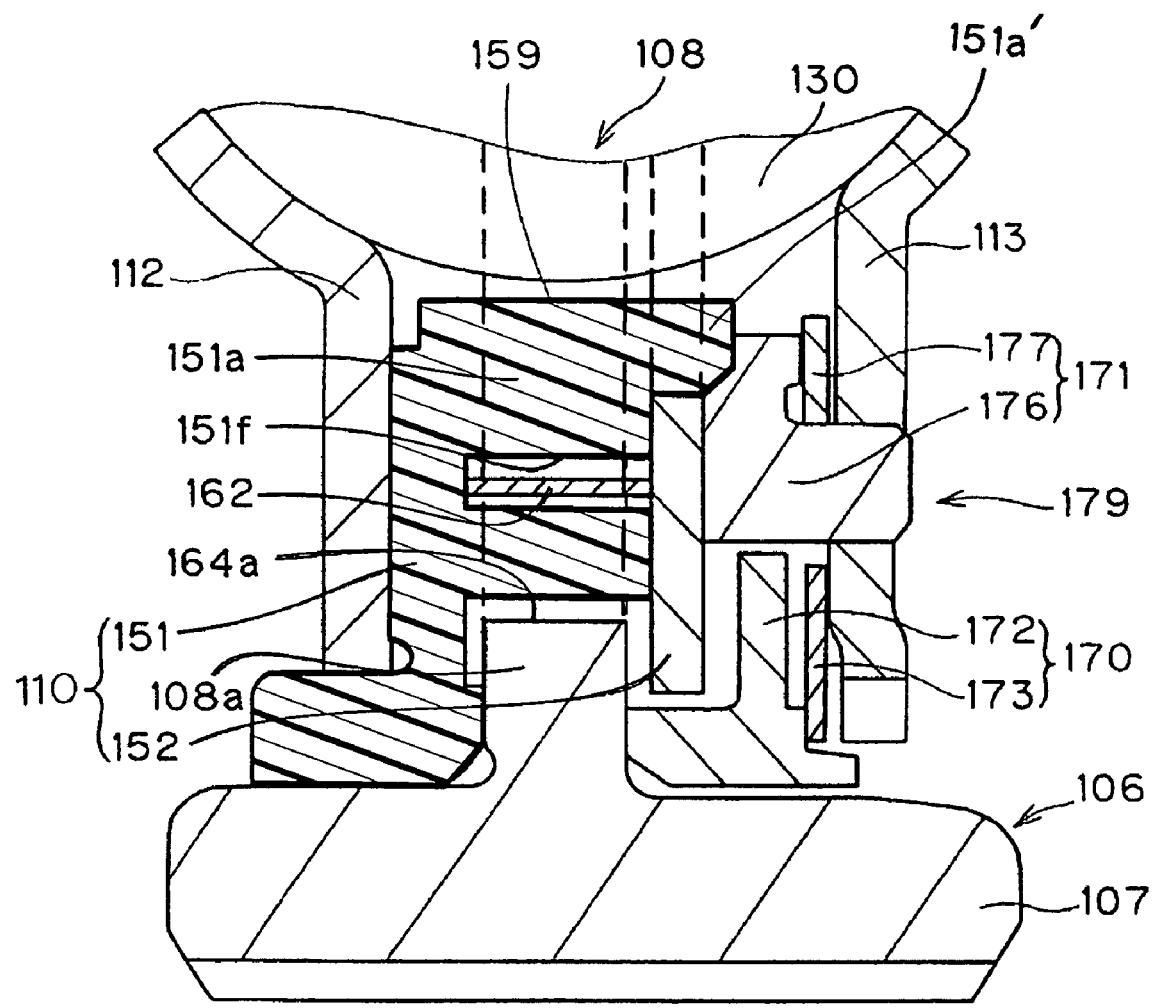
FIG. 7 is an enlarged fragmentary view of FIG. 1 illustrating a vertical cross-section of the friction generating mechanism.
Figure 8:
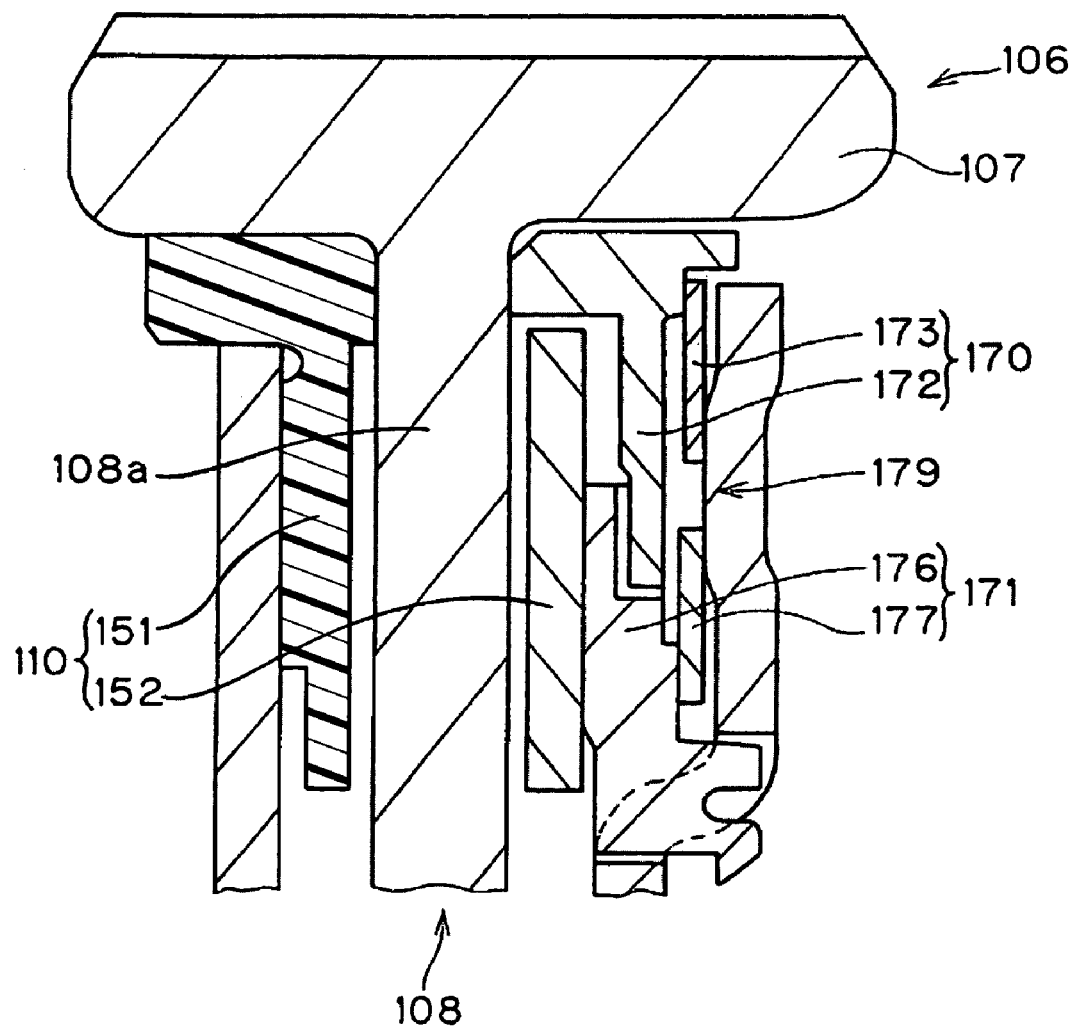
FIG. 8 is an enlarged fragmentary view of FIG. 1 illustrating a vertical cross-section of the friction generating mechanism.

Referring again to FIG. 1, the plate 152 is a member placed between the flange 108 and the retaining plate 113 and is typically made of sheet metal. As seen in FIGS. 7 and 10, the plate 152 engages with protruding part 151a' of the protruding part 151a of the bush 151, so that both members 151 and 152 rotate together. As seen in FIG. 5, the protruding parts 152a are formed extending radially outward on the outer periphery of the plate 152. A bent tongue 152b is formed to extend axially toward the engine side on the edge of each protruding part 152a on the rotational direction R2 side. The bent tongue 152b is separated from the rotational direction concave part 165a of the first window opening 143 by an angle of θ15 in the rotational direction R2, and abuts or is close to the rotational direction R1 side edge of the first elastic member 130. Therefore, the bent tongue 152b will be closed in the concave part 165a when it moves toward the hub 106 by an angle of θ15 in the rotational direction R1, and supports the rotational R1 side of the first elastic member 130 together with the rotational direction support part 165. Under this condition, the tongue 152b is sandwiched between the rotational direction support part 165 of first window opening 143 on the rotational direction R1 side and the edge of the second elastic member 131 on the rotational direction R1 side. Thus, the tongue 152b can move away from the flange 108 in the rotational direction R2 side but cannot move toward the rotational direction R1 side.

As seen in FIG. 9, the rotational direction R1 side edge 152c of the protruding part 152a is provided close to the rotational direction R side edge of the second elastic member 131 as shown in FIG. 9, and secures a rotation gap 133 (θ4).

Referring to FIG. 1, as can be seen from the above, the bush 151 and the plate 152 not only abut each other in the axial direction, but also engage each other in the rotational direction to constitute a single member (the intermediate rotating member 110) that rotates as a unit. Since the axial distance between the bush 151 and the plate 152 is larger than the axial thickness of the flange 108, both axial sides of the flange 108 are interposed by the members 151 and 152. Thus, the intermediate rotating member 110 is made of two members, i.e., the bush 151 and the plate 152, and the bush 151 has a protruding part 151a that engages with the plate 152. Hence, it is possible to omit a conventional auxiliary pin reducing the number of parts and the total cost.

(6) Friction Generating Mechanism

The clutch disk assembly 101 further includes a friction generating mechanism 179 provided for functioning in parallel with the elastic connection mechanism 104. The friction generating mechanism 179 has a first friction generating unit 170 to generate low hysteresis torque and a second friction generating unit 171 to generate high hysteresis torque.

Figure 6:
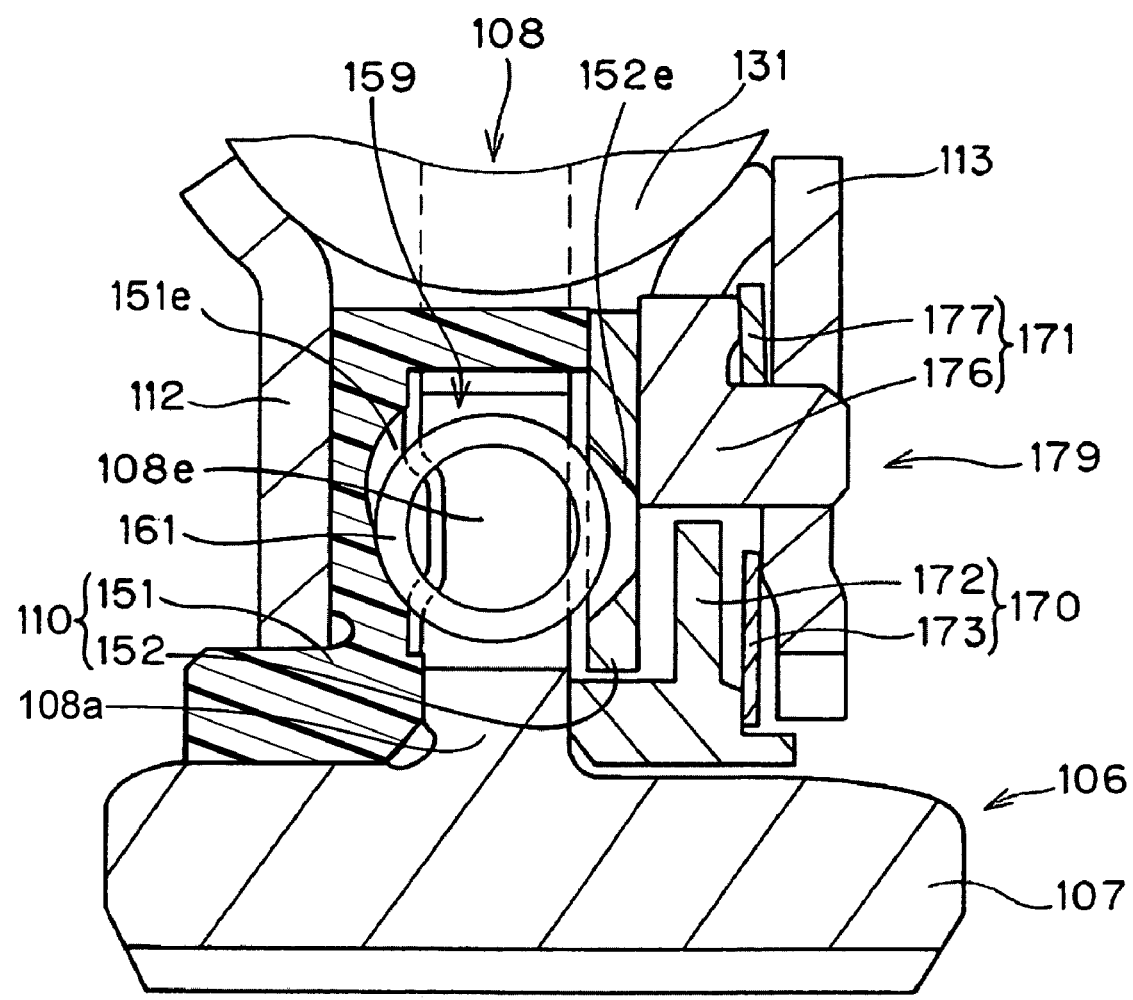
FIG. 6 is an enlarged fragmentary view of FIG. 2 illustrating a vertical cross-section of a friction generating mechanism of the clutch disk assembly.

The first friction generating unit 170 is provided to generate the hysteresis torque in the entire region where the elastic connection mechanism 104 is operating, i.e., on both of the positive and negative sides of the torsional characteristics. As seen in FIG. 6, the first friction generating unit 170 is equipped with a first bush 172 and a first cone spring 173. The first bush 172 and the first cone spring 173 are provided between the inner periphery part 108a of the flange 108 and the inner periphery part of the retaining plate 113. The first bush 172 is preferably a washer-like member and has a friction surface that abuts the inner periphery 108a of flange 108 on its transmission side in the axial direction in such a way as to be able to slide. The first cone spring 173 is placed axially between the first bush 172 and an inner periphery part of the retaining plate 113. Further, the first cone spring 173 is axially compressed. Due to the structure of the first friction generating unit 170 as described above, the first bush 172 rotates together with the clutch plate 112 and the retaining plate 113 and is pressed against the flange 108 in the axial direction due to the elastic force of the first cone spring 173 and is capable of sliding in the rotational direction.

The second friction generating unit 171 is equipped with a second bush 176 and a second cone spring 177. The second bush 176 and the second cone spring 177 are placed between the center part of the plate 152 and the inner periphery of the retaining plate 113 in the axial direction, in other words, on the radial outer side of the first bush 172 and the first cone spring 173. The second bush 176 has a friction surface that abuts the center part of the plate 152 on its transmission side in the axial direction. The second bush 176 has a protrusion that extends in the axial direction from its annular main body and penetrates into an opening formed in the retaining plate 113. Due to this engagement, the second bush 176 is movable in the axial direction, but is not rotatable relative to the retaining plate 113. The second cone spring 177 is placed axially between the second bush 176 and the inner periphery of the retaining plate 113 and is axially compressed between them. A concave part is formed on the inner periphery of the second bush 176 for the protrusion extending from the first bush 172 to engage therewith in the rotational direction, and this engagement makes it possible for the first bush 172 to rotate together with the second bush 176 and the retaining plate 113. Due to the structure of the second friction generating unit 171 as described above, the second bush 176 rotates together with the retaining plate 113 and the clutch plate 112 are pressed against the intermediate rotating member 110 in the axial direction due to the elastic force of the second cone spring 177 and are capable of sliding in the rotational direction. The hysteresis torque generated by the second friction generating unit 171 is substantially larger (10–20 times larger) than that generated in the first friction generating unit 170.

(7) First Damper Mechanism

Figure 11:
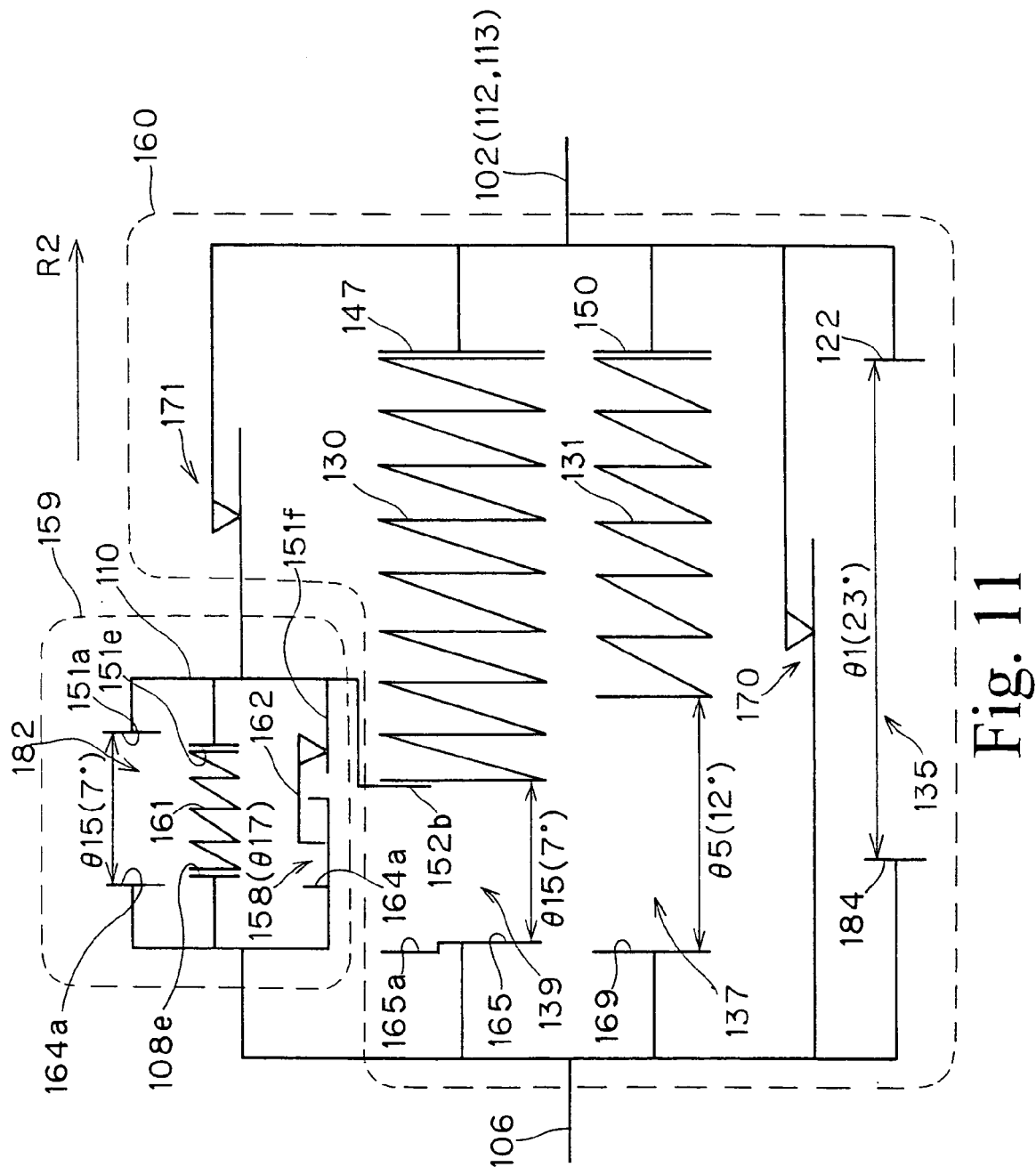
FIG. 11 is a view of a schematic drawing of a damper mechanism of the clutch disk assembly of FIG. 1.

Referring to FIG. 11, the first damper mechanism 159 will be described below. The first damper mechanism 159 is a mechanism that elastically connects the intermediate rotating member 110 with the hub 106 in the rotating direction, and is intended to absorb and attenuate minute torsional vibrations during idling by realizing characteristics of a low rigidity in the zero angle vicinity of the torsional characteristics. In other words, the elastic connection mechanism 104 is a second damper mechanism 160 (elastic connection mechanism) for absorbing and attenuating torsional vibrations during the normal running of a vehicle.

The first damper mechanism 159 primarily is made of a small coil spring 161 and a plate spring 162 (plate member). The small coil spring 161 transmits torque between the intermediate rotating member 110 and the hub 106 and generates a desired rigidity by being compressed in the rotational direction when the two members rotate relatively. The plate spring 162 generates a friction resistance when the intermediate rotating member 110 and the hub 106 rotate relatively.

The small coil spring 161 is provided radially inside the second elastic member 131. Moreover, the coil diameter and free length of the small coil spring 161 are substantially shorter than those of the second elastic member 131 and their center positions match approximately in the rotational direction. Therefore, both ends of the small coil spring 161 in the rotational direction are located inside second elastic member 131 in the rotational direction. The small coil spring 161 is stored inside a window opening 108e of the inner periphery 108a of flange 108 as shown in FIG. 6. In other words, both ends of the small coil spring 161 are supported by both ends of the window opening 108e in the circumferential direction. Moreover, the spring support parts 151e and 152e are provided on both the bush 151 and the plate 152. The spring support parts 151e and 152e are concave parts indented axially outward on the axial inner side surface of each member and support the small spring 161 on its outside in the axial direction and both sides in the rotational direction. In other words, both ends of the small coil spring 161 in the rotational direction are supported by both ends of the spring supports 151e and 152e in the rotational direction. The window opening 108e can be provided connective with the second window opening 144 or independently.

As shown in FIG. 7, the plate spring 162 is provided inside a groove 151f formed on the transmission side (the plate 152 side) in the axial direction of the protruding part 151a of the bush 151. The groove 151f extends in an arc-like shape in the rotational direction as shown in FIG. 10, and both ends thereof open to the rotational direction. The plate spring 162 has an axial height substantially equal to that of the groove 151f and extends along the groove 151f in an arc-like shape in the rotational direction. The plate spring 162 is compressed in the radial direction in the groove 151f. Both ends of the plate spring 162 in the rotational direction are pressed against an outer peripheral side wall of the groove 151f. Further, the middle portion of the plate spring 162 in the rotational direction is pressed against the inner peripheral side wall of the groove 151f. Moreover, the rotational direction length (angle) of the plate spring 162 is greater than the rotational direction length (angle) of the groove 151f, so that both ends or one end of the plate spring 162 is protruding from the groove 151f, i.e., the protruding part 151a in the rotational direction. The rotational direction angle of the plate spring 162 is smaller than the rotational direction angle of the radial direction concave part 164a, and secures a rotational direction gap 158. The torsional angle of the rotational direction gap 158 is θ17, and the value of θ17 in this embodiment is preferably 4 degrees. In FIG. 10, the rotational direction gap 158 is shown between the end of the plate spring 162 on the rotational direction R1 side and the wall of the concave part 164a on the rotational direction R1 side. The rotational direction gap may appear on the opposite side or on both sides in the rotational direction. In other words, the rotational direction gap is secured between at least one of the ends of the plate member 162 and the wall of the concave part 164a. In a different way of explaining about the above-mentioned structure, the intermediate rotating member 110 has a protruding part 151a as a holding portion with a groove 151f extending in the rotational direction and having opposite openings. Furthermore, the plate spring 162 is accommodated within the groove 151f. The plate spring 162 is longer than the groove 151f in the rotational direction. The flange 108 of the hub 106 includes the concave part 164a with the walls as a pair of contact portions, which are located on each rotational direction side of the protruding part 151a and can abut with the ends of the plate spring 162.

(8) Rotating Direction Gap

With reference to FIG. 5, the relationships among the various torsional angles of the rotating direction gaps 135 through 137 and others will be described below. It should be noted that specific numerical values shown below are only examples used for the sake of explanation and are not meant to limit the invention.

The first rotational gap 135 represents the total torsional angle on the positive side of the torsional characteristics of the clutch disk assembly 101 and its size is represented by θ1. The specific numerical value of θ1 is preferably 23 degrees, but the invention is not limited by the numerical value. The second rotational gap 136 represents the total torsional angle on the negative side of the torsional characteristics of clutch disk assembly 101 and its size is represented by θ2. The specific numerical value of θ2 in this embodiment is preferably smaller than θ1, and more preferably is 13 degrees. Therefore, the sum of θ1 and θ2 represents the total torsional angle of the clutch disk assembly 101.

The third rotational gap 137 represents the torsional angle prior to the compression of the second elastic member 131, starts on the positive side of the torsional characteristics, and its torsional angle is represented as θ5. In this embodiment, the specific value of θ5 is preferably 12 degrees. The value of the torsional angle of the region where the second elastic member 131 is compressed is θ2, and θ5 is θ1–74 2. Consequently, the second stage of the positive side of the torsional characteristics includes the first region (7–12 degrees) where only the first elastic members 130 are compressed and the second region (12–23 degrees) which is a region larger than the first region and in which both the first elastic members 130 and the second elastic members 131 are compressed in parallel, thus achieving the multiple stage feature in the second stage of the positive side of the torsional characteristics.

The fourth rotational direction gap 138 is the torsional angle until the first elastic member 130 starts to be compressed on the negative side of the torsional characteristics. The torsional angle of the fourth rotational direction gap 138 is expressed as θ6, and the specific value of θ6 is preferably 11 degrees. If the value of the torsional angle of the region where the first elastic member 130 is compressed is named θ3, then θ6 is θ2–θ3. Consequently, the second stage of the negative side of the torsional characteristics includes the third region (2–11 degrees) where only the second elastic members 131 are compressed and the fourth region (11–13 degrees) which is a region larger than the third region and in which both the first elastic members 130 and the second elastic member 131 are compressed in parallel, thus achieving the multiple stage feature in the second stage of the negative side of the torsional characteristics.

A rotational direction gap 139 is secured between the rotational direction supporting part 165 of the first window opening 143 on the rotational direction R1 side and the rotational direction R1 side edge of the first elastic member 130. As seen in FIG. 10, a rotational direction gap 182 is secured between the rotational direction R1 side edge of the radial direction concave part 164a of the flange 108 and the rotational direction R1 side edge of the protruding part 151a of the bush 151. The torsional angles of the rotational direction gap 139 and the rotational direction gap 182 are both θ15 and the specific value of θ15 is preferably 7 degrees in this embodiment. As seen in FIG. 9, a rotational direction gap 140 is secured between the rotational direction supporting part 165 of the first window opening 143 on the rotational direction R2 side and the rotational direction R2 side edge of the first elastic member 130. Referring again to FIG. 10, a rotational direction gap 181 is secured between the rotational direction R2 side edge of the radial direction concave part 164a of the flange 108 and the rotational direction R2 side edge of the protruding part 151a of the bush 151. The torsional angles of the rotational direction gap 140 and the rotational direction gap 181 are both θ16 and the specific value of θ16 is preferably 2 degrees in this embodiment.

Thus, the operating angle range of the first damper mechanism 159 is from torsion angle 0 degrees to θ15 on the positive side and to θ16 on the negative side as shown in FIG. 11. Moreover, within the operating angle of the first damper mechanism 159, the rigidity is provided primarily by the small coil spring 161, and the small hysteresis torque is obtained by the plate spring 162 slides on the groove 151f of the bush 151.

The rotational direction gap 133 is a rotational direction gap to prevent the torque of the second elastic member 131 from acting on the second friction generating unit 171 on the negative side second stage of the torsional characteristics. The torsional angle of the rotational direction gap 133 is θ4, and the value of θ4 in this embodiment is preferably 1 degrees.

(9) Torsional Characteristics

Figure 12:
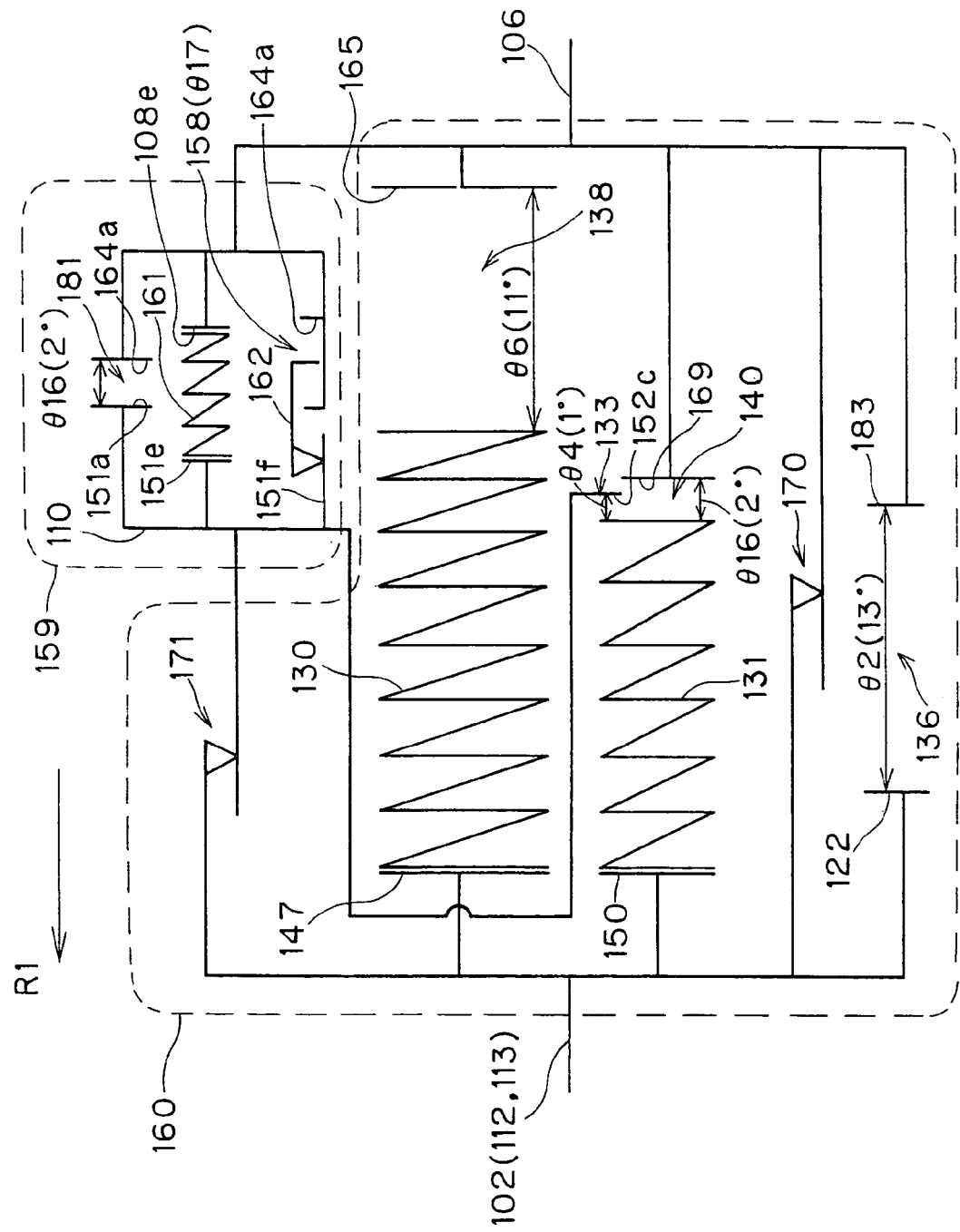
FIG. 12 is a view of a schematic drawing of the damper mechanism of the clutch disk assembly of FIG. 1.
Figure 13:
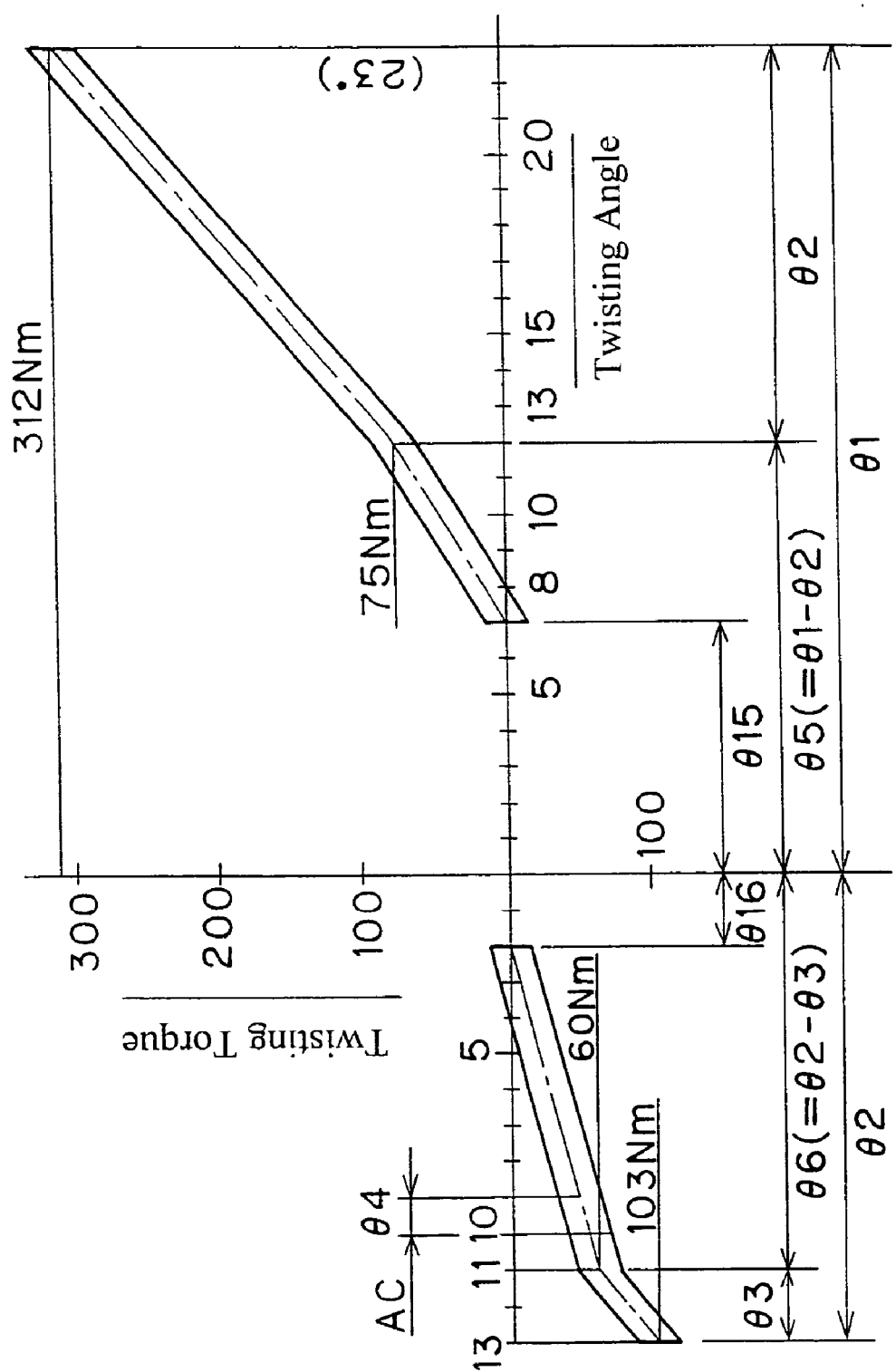
FIG. 13 is a view of a torque characteristic diagram of the clutch disk assembly of FIG. 1.

Next, the torsional characteristics of the clutch disk assembly 101 is described using schematic drawings of the damper mechanism shown in FIG. 11 and FIG. 12 as well as a torsional characteristic diagram shown in FIG. 13. The specific numerical values shown in FIG. 13 are disclosed as examples of those of an embodiment of the present invention and should not be construed to limit the invention.

First, an operation of the positive side region of the torsional characteristics will be described, in which starting from a neutral position shown in FIG. 11, where the input rotational member 102 is fixed, the hub 106 is twisted in the rotational direction R2 (as a result, the input rotational member 102 gets twisted relative to the output rotational member 103 in the rotational direction R1).

In the region where the torsional angle is the smallest, only the first damper mechanism 159 operates. More specifically, the small coil spring 161 is compressed in the rotational direction between the bush 151, the plate 152, and the flange 108. At this time, the plate spring 162 slides over the wall, thus being movable in the rotational direction, of the groove 151f of the protruding part 151a being pressed or pushed by the rotating direction wall of the radial direction concave part 164a. Thus, the plate spring or member 162 is configured to pushed by the first rotating member or hub 106, and be movable in the rotational direction when pushed. When the rotating direction R1 side edge of the concave part 164a abuts the rotational direction R1 side edge of the protruding part 151a, the motion of the first damper mechanism 159 stops. In order for this to happen, the plate spring or member 162 must be elastically deformed. Moreover, when this torsional angle is θ17, the rotating direction support part 165 of the first window opening 143 on the rotational direction R1 side abuts the rotational direction R1 side edge of the first elastic material 130, and the concave part 165a abuts the bent tongue 152b of the plate 152. From thereon, the bent tongue 152b is kept pressed onto the concave part 165a by the rotational direction R1 side edge of the first elastic member 130.

When the torsional angle further increases, only the second damper mechanism 160 operates. In a region where the torsional angle is small, the two first elastic members 130 are compressed. When the absolute value of the torsional angle becomes larger than θ5, the rotational direction support parts 169 of the second window openings 144 on the rotational direction R1 side abut with the side edge of the second elastic members 131 in the rotational direction R1. From thereon, the two first elastic members 130 are compressed in parallel with the two second elastic members 131, thus providing a high rigidity characteristic. Also, the first friction generating unit 170 and the second friction generating unit 171 operate, thus providing a high hysteresis characteristic. In the second friction generating unit 171, the intermediate rotating member 110 rotates together with the flange 108 in the rotational direction R2 as the bent tongues 152b are pressed against the rotational support parts 165 of the first window openings 143 on the R1 side, and slides relative to the clutch plate 112 and the second bush 176.

In the positive side of the torsional characteristics, the bent tongues 152b of the intermediate rotational member 110 are constantly pressed against the rotating direction support part 165 of the first window opening 143 on the rotation direction R1 side by the first elastic members 130 when minute torsional vibrations enter the clutch disk assembly 101. Therefore, in the region where only the second damper 160 operates, the intermediate rotating member 110 cannot rotate relative to the flange 108, and the elastic forces of the elastic members 130 and 131 consistently act on the second friction generating unit 171 via the intermediate rotating member 110 even when minute vibrations are being inputted. In other words, when the input rotating member 102 and the output rotating member 103 rotate relative to each other, the second friction generating unit 171 consistently acts and generates high hysteresis torque on the positive side of the torsional characteristics.

Next, an operation of the negative side region of the torsional characteristics will be described, in which, starting from a neutral position shown in FIG. 12, where the input rotational member 102 is fixed, the hub 106 is twisted in the rotational direction R1 (as a result, the input rotational member 102 is twisted relative to the output rotational member 103 in the rotational direction R2). In the region where the torsional angle is the smallest, only the first damper mechanism 159 operates. More specifically, the small coil spring 161 is compressed in the rotational direction between the bush 151, the plate 152, and the flange 108. At this time, the plate spring 162 slides over the wall of the groove 151f of the protruding part 151a being pressed by the rotating direction wall of the radial direction concave part 164a. When the rotating direction R2 side edge of the concave part 164a abuts the rotational direction R2 side edge of the protruding part 151a, the motion of the first damper mechanism 159 stops. Moreover, when this torsional angle is $\theta 16$, the rotational direction support part 169 of the second window opening 144 on the rotational direction R2 side abuts the rotational direction R2 side edge of the second elastic member 131.

When the torsional angle further increases, only the second damper mechanism 160 operates. In a region where the torsional angle is small, only the two second elastic members 131 are compressed and a lower rigidity is achieved in comparison with the positive side. Also, the first friction generating unit 170 and the second friction generating unit 171 operate, thus providing a high hysteresis characteristic. At this time in the second friction generating unit 171, the intermediate rotating member 110 rotates together with the flange 108 in the rotational direction R1 and slides relative to the second bush 176 as the protruding part 151a of the bush 151 is pressed to rotational direction R2 side edge of the radial direction concave parts 164a. Since the intermediate rotating member 110 rotates together with the hub 106 as described above, the rotational angle $\theta 4$ of the rotational direction gap 133 is secured between the rotational direction R2 side edge of the second elastic member 131 and the edge 152c of the plate 152.

When the absolute value of the torsional angle becomes $\theta 6$, the rotational direction support parts 165 of the first window openings 143 on the rotational direction R2 side abut with the side edge of the first elastic members 130 in the rotational direction R2. From thereon, the two first elastic members 130 are compressed in parallel with the two second elastic members 131. As a result, high rigidity and high hysteresis torque torsional characteristics are achieved.

As can be seen from the above, the second elastic members 131 are compressed only within the range of torsional angle $\theta 2$ (which is smaller than the positive side total angle $\theta 1$) in the positive side of the torsional characteristics, the angle compressed on the positive side is equal to the angle compressed on the negative side (negative side total angle). In an alternative embodiment, the angle that the second elastic members 131 are compressed on the positive side can be selected to be smaller than the angle that they are compressed on the negative side (negative side total angle). Such an alternative of choosing the angle of compression of the second elastic members 131 to be no greater than the angle of compression on the negative side (negative side total angle), the second elastic members can be of a low rigidity and a low torque capacity. As a result, the shape of the second elastic member 131 can be made smaller than that of the first elastic member 130 as mentioned before, thus making it easier to place the second elastic member 131 radially inside the operating range of the stop pin 122.

Next, with reference to a torsional diagram shown in FIG. 13, the torsional characteristics will be described for various torsional vibrations entering clutch disk assembly 101. When a torsional vibration with large amplitudes such as the forward/backward vibration of a vehicle occurs, the torsional characteristics go through repetitive variations over both the positive and negative sides. In this case, the forward/backward vibrations will be attenuated quickly through hysteresis torque that develops on both the positive and negative sides.

Next, let us assume minute torsional vibrations enter the clutch disk assembly 101 resulting from the engine combustion fluctuations during a deceleration period accompanying engine braking. At this time, the load on the elastic member 131 does not act on the plate 152, i.e., the intermediate rotating member 110, for minute torsional vibrations within the torsional angle $\theta 4$, so that intermediate rotating member 110 develops neither any relative rotation in relation to the plates 112 and 113 in the second friction generating part 171, nor any slide on the clutch plate 112 and the second bush 176. In other words, hysteresis torque (hysteresis torque by means of the first friction generating unit 170) is much smaller than the hysteresis torque on the negative side, and is obtained in the range of the torsional angle $\theta 4$. The hysteresis torque within $\theta 4$ should preferably be in the range of 1/10 of the hysteresis torque of the total range. As can be seen from the above, the vibration and noise level during a deceleration period accompanying engine braking can be substantially reduced as a rotational gap is provided for preventing the second friction generating unit 171 from operating within a specified angle on the negative side of the torsional characteristics.

Since a rotational direction gap for preventing the second friction generating unit 171 from operating within a specified angle is not provided on the positive side of the torsional characteristics, the noise and vibration performance in the vicinity of resonance rpm does not deteriorate, for example, on a FF, front engine and front drive, car, in which it is rather difficult to eliminate resonance peaks completely from the practical rpm range. Since rotational gaps are provided for preventing the friction mechanism from operating within a specified angle only on one of the positive and negative sides of the torsional characteristics, the noise and vibration performances in both acceleration and deceleration improve. As described above, the damper mechanism according to this invention not only uses different torsional rigidities on the positive and negative sides of the torsional characteristics, but also has a structure that prevents high hysteresis torque against minute torsional vibrations on one side of the torsional characteristics, preferable torsional characteristics can be achieved as a whole.

Figure 14:
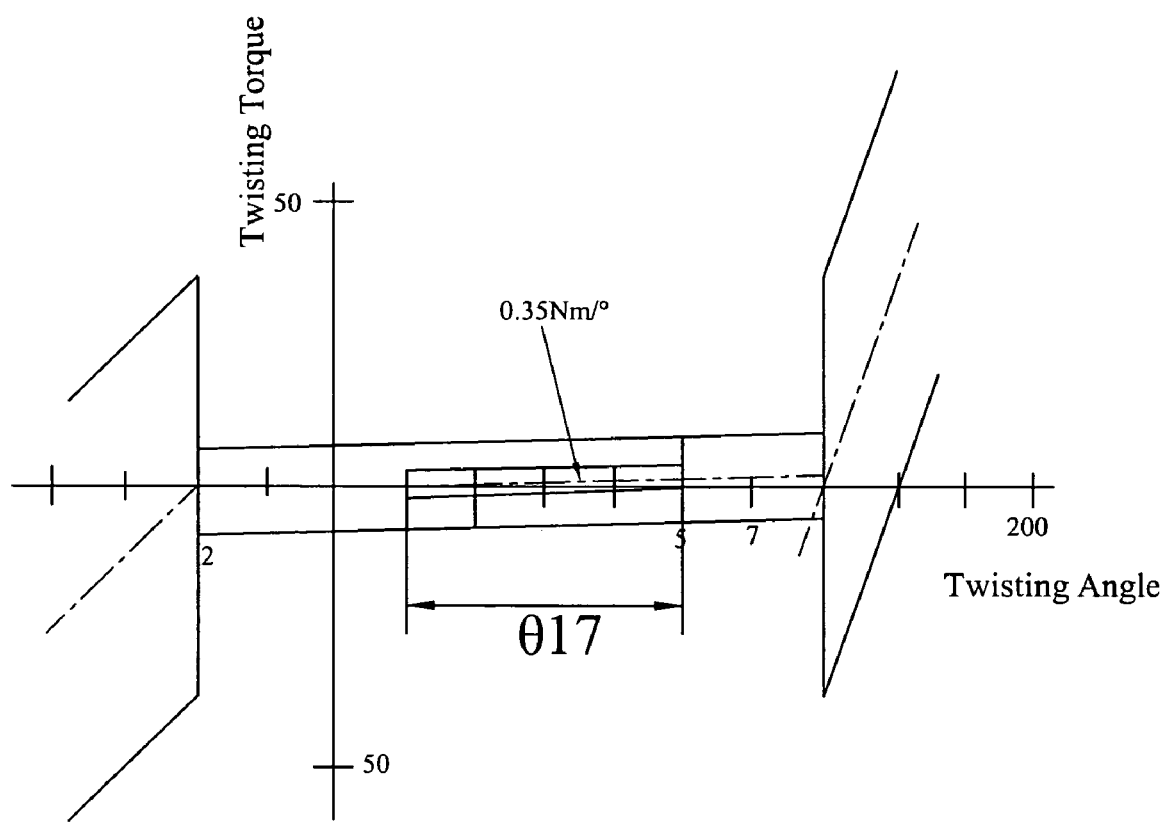
FIG. 14 is enlarged view of a first stage in the torsional characteristics of the clutch disk assembly.

Let us also assume that minute torsional vibrations enter the clutch disk assembly 101 during idling. In such a case, only the first damper mechanism 159 operates to provide low rigidity and low hysteresis characteristics. Consequently, the torsional vibrations are absorbed and attenuated, thus preventing odd noises during idling. In particular, the plate spring 162, which is a friction generating mechanism, does not operate for minute torsional vibrations of torsional angles less than θ17, even if the phenomena are within the first stage region of the torsional characteristics, so that hysteresis will be even smaller, as shown in FIG. 14. As a consequence, a super low hysteresis or a no-hysteresis condition is achieved within the range of θ17 in minute torsional vibrations during idling, while a slightly larger, in other words, intermediate hysteresis can be achieved on both sides of the condition.

As shown in FIG. 10, the plate spring 162 is provided in the groove 151ƒ of the bush 151 in the first damper mechanism 159 in order to materialize friction resistance generating mechanism, thus the following advantages are realized:

(1) Since a single plate spring 162 is used to constitute the friction generating mechanism of the first damper mechanism 159, the number of parts is minimized and a simpler structure is achieved.

(2) Since the plate spring 162 is held by the bush 151, a space saving structure is achieved. Especially, since the spring plate 162 is accommodated in the groove 151ƒ of the bush 151, the space saving effect is improved.

(3) Since the load and friction coefficient are dependent on plate spring 162 alone, it is easier to set the amount of frictional resistance in the first damper mechanism 159.

(4) Since the load is generated in the radius direction by the use of plate spring 162, the structure is simpler compared to the conventional design wherein the load is generated in the axial direction.

(5) The size of the super low hysteresis generating region in the first stage region can be adjusted by simply changing the rotational direction length of the plate spring 162.

(6) In conventional structures, the friction generating mechanism for small friction resistance is difficult to realize due to the complicated structure or space limitations. In those cases, the activation of the second stage spring in the conventional design produces noise when an additional load is applied to the engine during idling by activating power steering or turning on lights and rotation fluctuation becomes large. The present invention, however, prevents noise development by generating a sliding hysteresis torque with the plate spring 162.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the above-mentioned embodiment, the plate spring 162 is a plate made of metal, especially of steel, the plate spring can be made of other materials.

Figure 15:
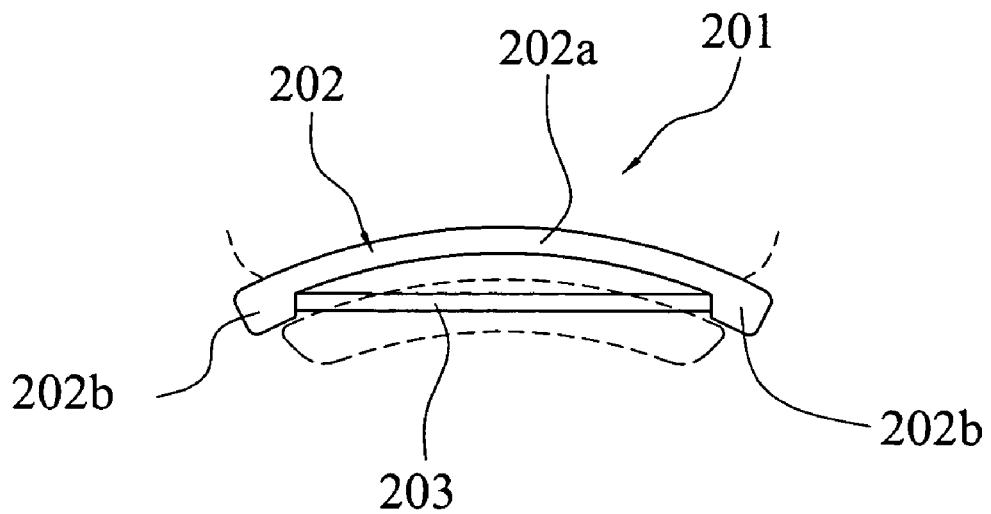
FIG. 15 is an elevational view of a plate spring of the clutch disk assembly in a free state in accordance with an alternate embodiment of the present invention.
Figure 16:
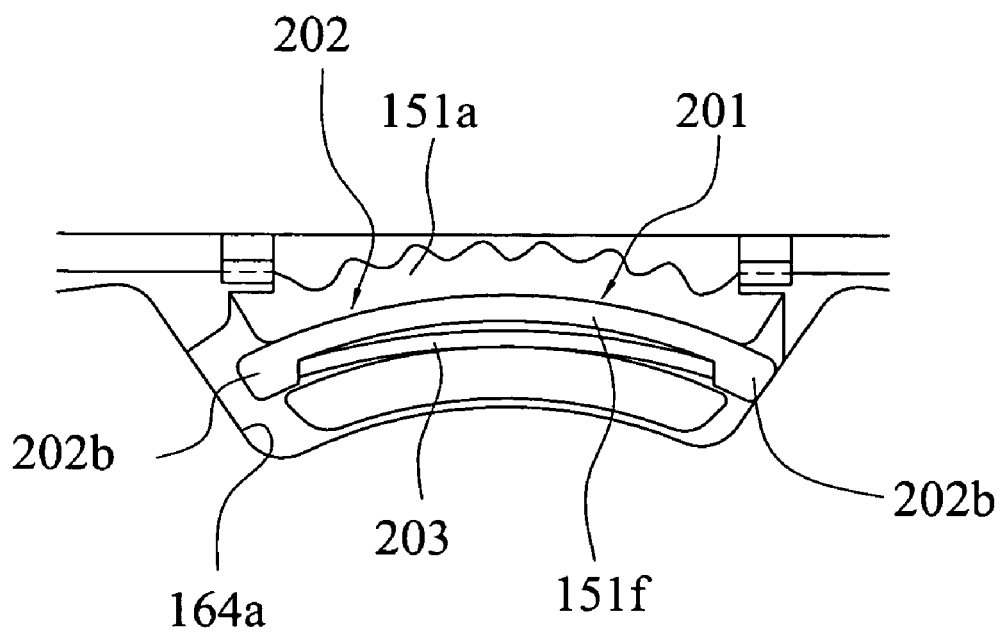
FIG. 16 is an elevational view of the installed plate spring of FIG. 15 of the present invention.

In an embodiment shown in FIG. 15 and FIG. 16, a plate spring 201 is made of a first member 202 and a second member 203. The first member 202 is preferably made of resin, and the second member 203 is preferably made of metal. The first member 202 extends in an arc shape and has an arc main body 202a and supporting portions 202b extending radially inward from each end of the main body 202a. The second member 203 extends substantially straight in a free state in FIG. 15 such that both ends are in contact with and supported by the supporting portions 202b. As a result, the second member 203 is held on the radially inward portion of the first member 202. In other words, the plate spring 201 has a radially outer surface made of the first member 202 and a radially inner surface made of the second member 203.

As shown in FIG. 16, when the plate spring 201 is installed into the groove 151ƒ of the protruding part 151a, the second member 203 bends such that the central portion in the rotational direction moves radially outward compared to the ends in the rotational direction. Further, the first member 202 bends such that the ends in the rotational direction moves radially inward compared to the central portion in the rotational direction. In the end, the first member 202 is urged against a radially outward wall of the groove 151ƒ and the second member 203 is urged against a radially inward wall of the groove 151ƒ.

The basic function and effect of the plate spring 201 are the same as those of the plate spring 162 in the above-mentioned embodiment. Since the plate member 201 is composed of two components, it is possible to realize proper spring force and friction coefficient by properly combining components of different materials. Especially, since the first member 202 is made of resin, it is easy to realize a proper friction coefficient by selecting the proper materials.

Figure 17:
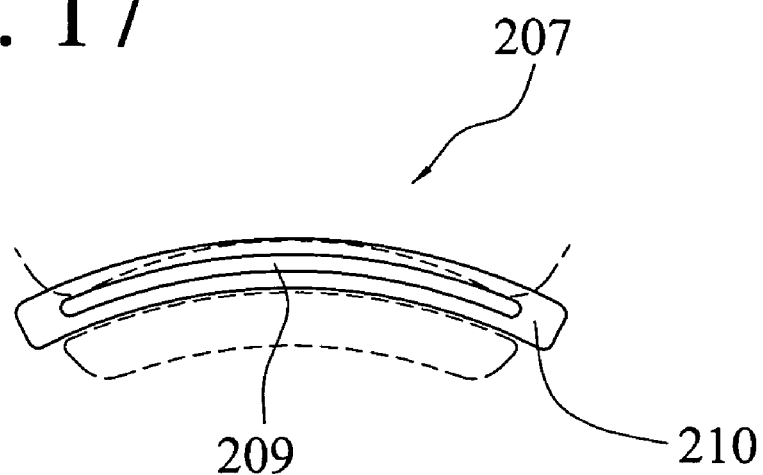
FIG. 17 is an elevational view of a plate spring in a free state in accordance with a third preferred embodiment of the present invention.
Figure 18:
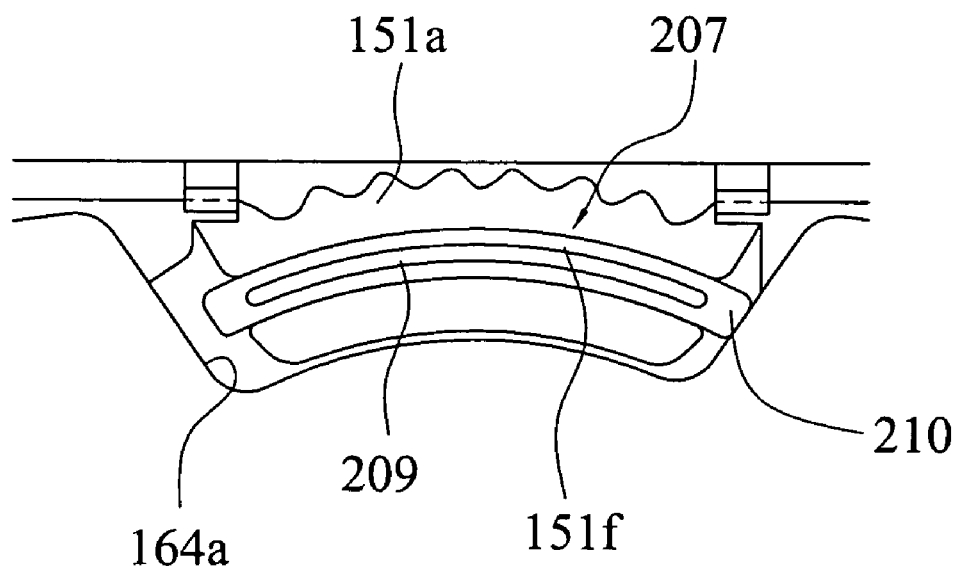
FIG. 18 is an elevational view of the installed plate spring of FIG. 17.

In the other embodiment shown in FIG. 17 and FIG. 18, the plate spring 207 is preferably made of resin having a first layer 209 and a second layer 210. The first layer 209 extends in an arc shape. The second layer 210 covers a whole surface of the first layer 209 and is integrally formed with the first layer 209. In other words, the second layer 210 encompasses the first layer 209. The plate spring 207 extends in an arc shape in a free state as shown in FIG. 17.

As shown in FIG. 18, when the plate spring 207 is installed into the groove 151ƒ of the protruding part 151a, the plate spring 207 bends such that the ends in the rotational direction move radially inward compared to the central portion in the rotational direction. In the end, the central portion of the plate spring 207 in the rotational direction is urged against a radially inward wall of the groove 151ƒ and the ends of the plate spring 207 in the rotational direction are urged against a radially outward wall of the groove 151ƒ.

The basic function and effect of the plate spring 207 are the same as those of the plate spring 162 in the above-mentioned embodiment. Since the plate spring 207 is composed of two resin materials, it is possible to realize proper spring force and friction coefficient by properly combining components with different resin materials. Preferably, materials of the first layer 209 are selected considering elastic coefficient, and materials of the second layer 210 are selected considering spring coefficient, so that it is possible to achieve the most appropriate combination.

The structure of the clutch disk assembly to which this invention is applied is not limited to the embodiment described above. For example, the invention can be applied to a structure connected by a damper where the flange and the boss of the hub are separated.

The damper based on this invention can be applied to mechanisms other than the clutch disk assembly. For example, it can be applied to a damper mechanism elastically connecting two flywheels in the rotational direction as well.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-075952. The entire disclosures of Japanese Patent Application Nos. 2003-075952 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A damper mechanism and a damper disk assembly comprising:
    a first rotating member having a flange having a window opening being formed therein;
    a second rotating member being disposed relatively rotatable to said first rotating member; and
    a plate member being supported by said second rotating member, being movable with respect to said first and second rotating members in a rotation direction, and extending in a rotational direction having main surfaces facing in the radial directions, said plate member being configured to be pushed by said first rotating member in said rotational direction to slide against said second rotating member and to generate friction resistance during relative rotation of said first and second rotating members, said plate member being arranged in said window portion.

2. The damper mechanism according to claim 1, wherein said plate member is held by said second rotating member such that said plate member is elastically deformed.

3. The damper mechanism according to claim 2, wherein said second rotating member includes a holding portion having a groove extending in the rotational direction and having opposite openings in the rotational direction,
    said plate member is disposed in said groove having a rotational direction length longer than that of said groove,
    said first rotating member has a pair of contact portions disposed on each rotational direction side of said holding portion, said contact portions are configured to contact ends of said plate member.

4. The damper mechanism according to claim 3, wherein a rotational direction length between said pair of contact portions is longer than a rotational direction length of said plate member, so that a rotational direction gap is secured at least between one of ends of said plate member and one of said contact portions.

5. The damper mechanism according to claim 4, further comprising an elastic member being compressed in the rotational direction when said first and second rotating member rotate relative to each other.

6. The damper mechanism according to claim 1, wherein said second rotating member includes a holding portion having a groove extending in the rotational direction and having opposite openings in the rotational direction,
    said plate member is disposed in said groove having a rotational direction length longer than that of said groove,
    said first rotating member has a pair of contact portions disposed on each rotational direction side of said holding portion, said contact portions are configured to contact ends of said plate member.

7. The damper mechanism according to claim 1, further comprising an elastic member being compressed in the rotational direction when said first and second rotating member rotate relative to each other.

8. A damper disk assembly for transmitting torque in a vehicle comprising:
    a hub having a flange having a window opening being formed therein;
    a disk-shaped rotating member being disposed relatively rotatable to said hub;
    an elastic connection mechanism elastically connecting said hub with said disk-shaped rotating member in a rotational direction; and
    a damper mechanism being configured to absorb and to attenuate torsional vibration during idling of the vehicle, said damper mechanism operating only within an angular range from a zero torsional angle smaller than that within which said elastic connection mechanism operates, said damper mechanism including an intermediate rotating member relatively rotatable to said hub within a limited angle, and a plate member being arranged in said window opening in an elastically deformed state and extending in said rotational direction having main surfaces facing in the radial directions,
    said plate member being configured to be pushed by said hub in said rotational direction to slide against said intermediate rotating member to generate friction resistance during relative rotation of said hub and intermediate rotating member.

9. The damper disk assembly according to claim 8, wherein said plate member is held by said intermediate rotating member such that said plate member is movable in said rotational direction when said hub pushes said plate member.

10. The damper disk assembly according to claim 9, wherein said intermediate rotating member is formed with a holding portion having a groove extending in said rotational direction and having opposite openings in said rotational direction,
    said plate member is disposed in said groove having a rotational direction length longer than that of said groove,
    said hub has a pair of contact portions disposed on each rotational direction side of said holding portion in said rotational direction, said contact portions are configured to contact ends of said plate member.

11. The damper disk assembly according to claim 10, wherein a rotational direction length between said pair of contact portions is longer than a rotational direction length of said plate member, so that a rotational direction gap is secured at least between one of said ends of said plate member and one of said contact portions.

12. A damper disk assembly according to claim 11, wherein said damper mechanism further includes an elastic member being configured to be compressed in said rotational direction when said hub and intermediate rotating member rotate relative to each other.

13. The damper disk assembly according to claim 8, wherein said intermediate rotating member is formed with a holding portion having a groove extending in said rotational direction and having opposite openings in said rotational direction, said plate member is disposed in said groove having a rotational direction length longer than that of said groove, said hub has a pair of contact portions disposed on each rotational direction side of said holding portion in said rotational direction, said contact portions are configured to contact ends of said plate member.

14. A damper disk assembly according to claim 8, wherein said damper mechanism further includes an elastic member being configured to be compressed in said rotational direction when said hub and intermediate rotating member rotate relative to each other.

15. The damper disk assembly according to claim 8, wherein said plate member includes a first member being made of a resin and having an arc shaped main body and supporting portions that extend radially inward from ends of said main body, and a second member being made of a metal that contacts said supporting portions.

16. The damper disk assembly according to claim 8, wherein said plate member includes a first layer and a second layer that encompasses said first layer.

17. The damper disk assembly according to claim 8, wherein said plate member is arranged to generate a force in a radial direction to generate friction.

* * * * *